US008515913B2

(12) United States Patent
Yamaguchi

(10) Patent No.: US 8,515,913 B2
(45) Date of Patent: Aug. 20, 2013

(54) FILE MANAGEMENT APPARATUS, FILE MANAGEMENT METHOD, AND COMPUTER READABLE MEDIUM STORING PROGRAM

(75) Inventor: Masayuki Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 151 days.

(21) Appl. No.: 13/234,884

(22) Filed: Sep. 16, 2011

(65) Prior Publication Data
US 2012/0191736 A1 Jul. 26, 2012

(30) Foreign Application Priority Data

Jan. 20, 2011 (JP) .................................. 2001-010014

(51) Int. Cl.
*G06F 17/00* (2006.01)
(52) U.S. Cl.
USPC ........................................................ 707/640
(58) Field of Classification Search
USPC ................. 707/610–615, 624–627, 634–649, 707/661–668
See application file for complete search history.

(56) References Cited

U.S. PATENT DOCUMENTS

| 2002/0049883 | A1* | 4/2002 | Schneider et al. ............ 711/100 |
| 2003/0078946 | A1* | 4/2003 | Costello et al. ............... 707/201 |
| 2009/0073884 | A1* | 3/2009 | Kodama et al. ............... 370/235 |
| 2010/0131584 | A1* | 5/2010 | Johnson ........................ 709/203 |
| 2010/0142542 | A1* | 6/2010 | Van Wie et al. ............... 370/400 |
| 2011/0145918 | A1* | 6/2011 | Jung et al. ........................ 726/22 |
| 2011/0164533 | A1* | 7/2011 | Krumel ......................... 370/255 |
| 2012/0066201 | A1* | 3/2012 | Suman et al. ................. 707/710 |

FOREIGN PATENT DOCUMENTS

JP 2002-082828 A 3/2002

* cited by examiner

*Primary Examiner* — Wilson Lee
(74) *Attorney, Agent, or Firm* — Sughrue Mion, PLLC

(57) ABSTRACT

A file management apparatus includes a register unit that registers on a memory a first information set mapping a link file to a file and registers on the memory a second information set indicating a storage location of the file if the file is newly stored or if the link file pointing to the file is generated, a processor unit that performs a process to determine a storage location of a file pointed to by the accessed link file in accordance with the first information set and the second information set registered on the memory, and a process to access the file stored at the determined storage location, and an update unit that updates the second information set indicating the storage location of the file such that the second information set indicates a storage location of the file subsequent to the movement of the file.

20 Claims, 18 Drawing Sheets

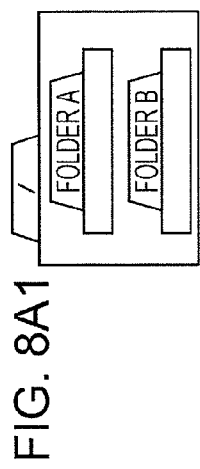

FIG. 8A1

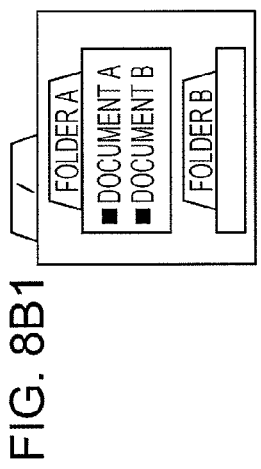

FIG. 8B1

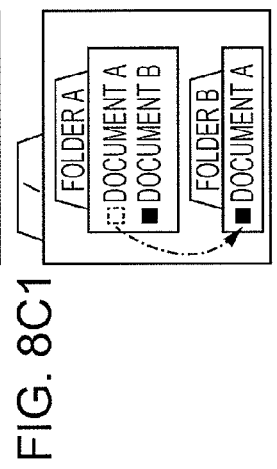

FIG. 8C1

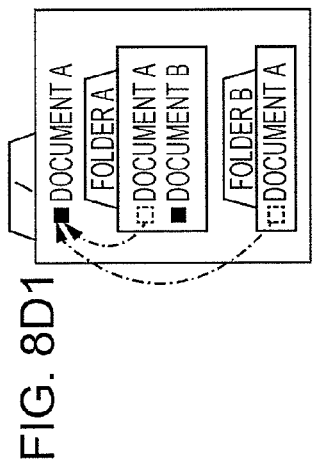

| LOCATION | TYPE | LINK DESTINATION | NAME | DELETE |
|---|---|---|---|---|
| / | FOLDER | | / | |
| / | FOLDER | | FOLDER A | |
| / | FOLDER | | FOLDER B | |

FIG. 8B2

| LOCATION | TYPE | LINK DESTINATION | NAME | DELETE |
|---|---|---|---|---|
| / | FOLDER | | / | |
| / | FOLDER | | FOLDER A | |
| / | FOLDER | | FOLDER B | |
| /FOLDER A/ | DOCUMENT | | DOCUMENT A | |
| /FOLDER A/ | DOCUMENT | | DOCUMENT B | |

FIG. 8C2

| LOCATION | TYPE | LINK DESTINATION | NAME | DELETE |
|---|---|---|---|---|
| / | FOLDER | | / | |
| / | FOLDER | | FOLDER A | |
| / | FOLDER | | FOLDER B | |
| /FOLDER A/ | DOCUMENT | | DOCUMENT A | |
| /FOLDER A/ | DOCUMENT | | DOCUMENT B | |
| /FOLDER B/ | DOCUMENT_LINK | /FOLDER B/DOCUMENT A | DOCUMENT A | |

FIG. 8D2

| LOCATION | TYPE | LINK DESTINATION | NAME | DELETE |
|---|---|---|---|---|
| / | FOLDER | | / | |
| / | FOLDER | | FOLDER A | |
| / | FOLDER | | FOLDER B | |
| /FOLDER A/ | DOCUMENT | | DOCUMENT A | |
| /FOLDER A/ | DOCUMENT_LINK | /DOCUMENT A | DOCUMENT B | |
| /FOLDER B/ | DOCUMENT_LINK | /DOCUMENT A | DOCUMENT A | |

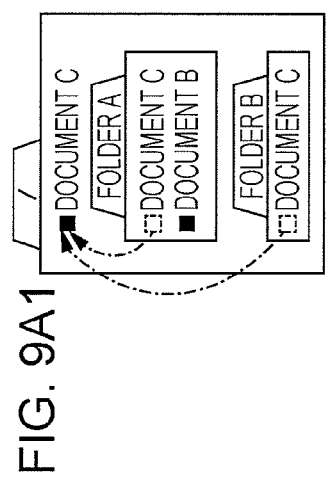

| LOCATION | TYPE | LINK DESTINATION | NAME | DELETE |
|---|---|---|---|---|
| / | FOLDER | | / | |
| / | FOLDER | | FOLDER A | |
| / | FOLDER | | FOLDER B | |
| / | DOCUMENT | | DOCUMENT C | |
| /FOLDER A/ | DOCUMENT | | DOCUMENT B | |
| /FOLDER A/ | DOCUMENT_LINK | /DOCUMENT C | DOCUMENT C | |
| /FOLDER B/ | DOCUMENT_LINK | /DOCUMENT C | DOCUMENT C | |

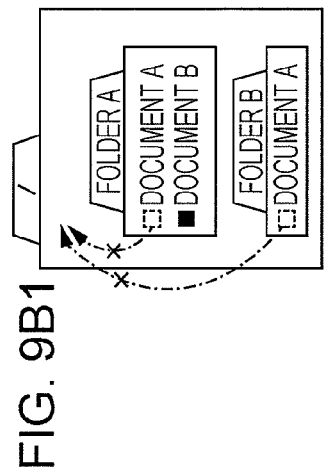

| LOCATION | TYPE | LINK DESTINATION | NAME | DELETE |
|---|---|---|---|---|
| / | FOLDER | | / | |
| / | FOLDER | | FOLDER A | |
| / | FOLDER | | FOLDER B | |
| /FOLDER A/ | DOCUMENT | | DOCUMENT B | |
| /FOLDER A/ | DOCUMENT_LINK | /DOCUMENT A | DOCUMENT A | ✓ |
| /FOLDER B/ | DOCUMENT_LINK | /DOCUMENT A | DOCUMENT A | ✓ |

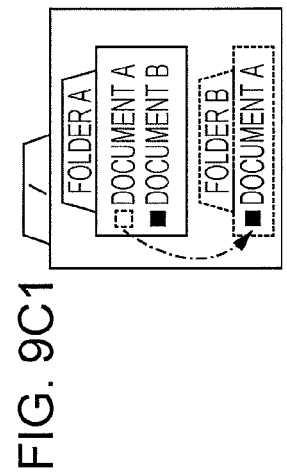

| LOCATION | TYPE | LINK DESTINATION | NAME | DELETE |
|---|---|---|---|---|
| / | FOLDER | | / | |
| / | FOLDER | | FOLDER A | |
| / | FOLDER | | FOLDER B | |
| /FOLDER B/ | DOCUMENT | | DOCUMENT A | |
| /FOLDER A/ | DOCUMENT | | DOCUMENT B | |
| /FOLDER A/ | DOCUMENT_LINK | /FOLDER B | DOCUMENT A | |

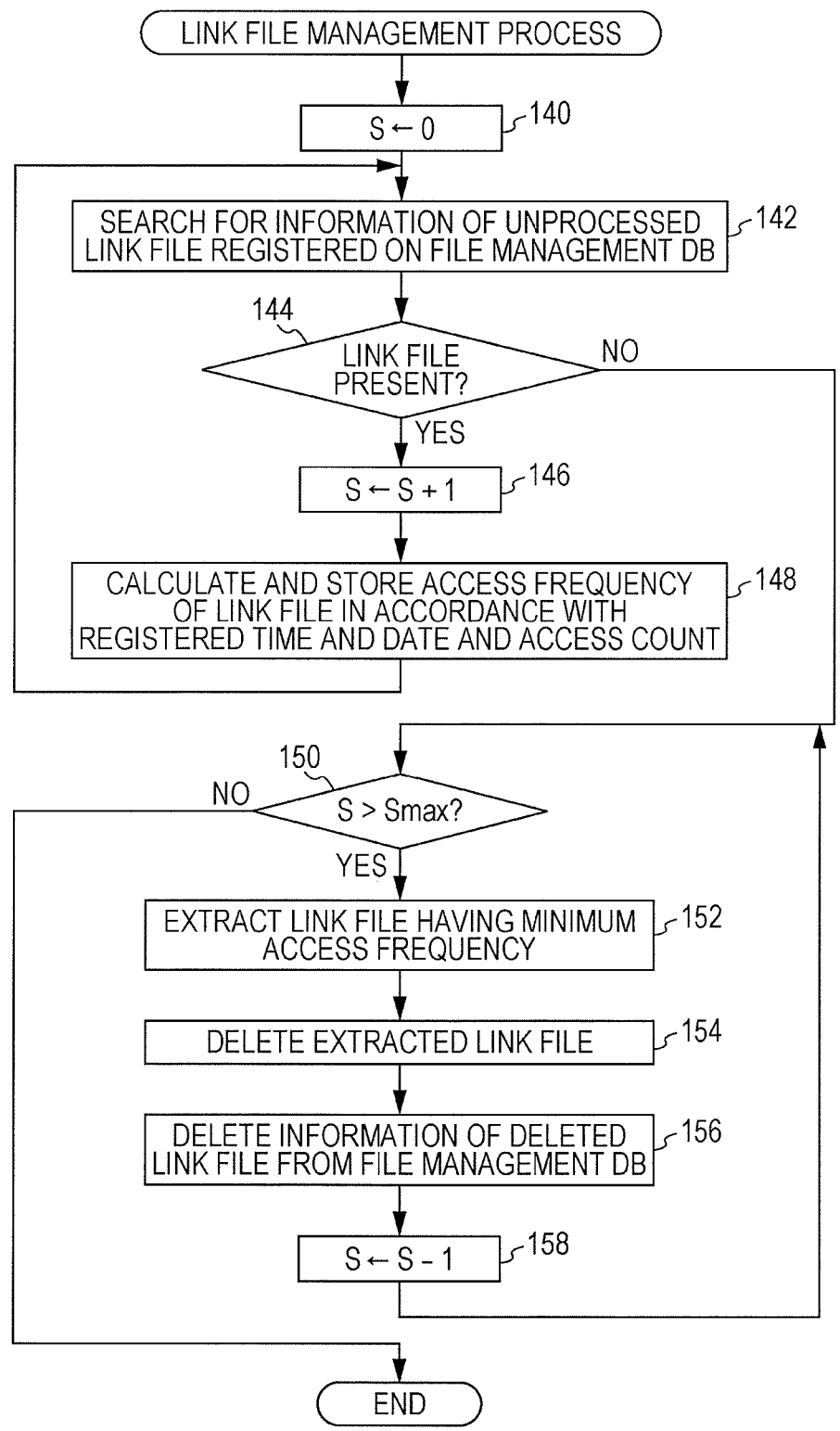

FIG. 20A1

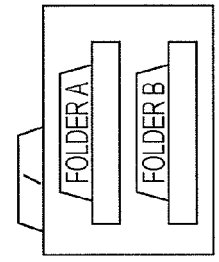

FIG. 20A2

| CONTENT IDENTIFIER | LOCATION IDENTIFIER | TYPE | LINK DESTINATION IDENTIFIER | NAME | DELETE | COMPRESS | DATE | COUNT |
|---|---|---|---|---|---|---|---|---|
| FOLDER_1 | | FOLDER | | / | | | | |
| FOLDER_2 | FOLDER_1 | FOLDER | | FOLDER A | | | | |
| FOLDER_3 | FOLDER_1 | FOLDER | | FOLDER B | | | | |

FIG. 20B1

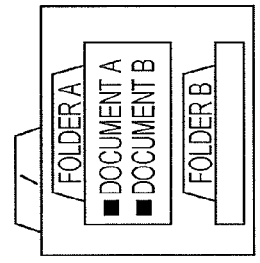

FIG. 20B2

| CONTENT IDENTIFIER | LOCATION IDENTIFIER | TYPE | LINK DESTINATION IDENTIFIER | NAME | DELETE | COMPRESS | DATE | COUNT |
|---|---|---|---|---|---|---|---|---|
| FOLDER_1 | | FOLDER | | / | | | | |
| FOLDER_2 | FOLDER_1 | FOLDER | | FOLDER A | | | | |
| FOLDER_3 | FOLDER_1 | FOLDER | | FOLDER B | | | | |
| DOCUMENT_001 | FOLDER_2 | DOCUMENT | | DOCUMENT A | | | | |
| DOCUMENT_002 | FOLDER_2 | DOCUMENT | | DOCUMENT B | | | | |

FIG. 20C1

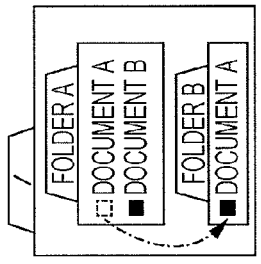

FIG. 20C2

| CONTENT IDENTIFIER | LOCATION IDENTIFIER | TYPE | LINK DESTINATION IDENTIFIER | NAME | DELETE | COMPRESS | DATE | COUNT |
|---|---|---|---|---|---|---|---|---|
| FOLDER_1 | | FOLDER | | / | | | | |
| FOLDER_2 | FOLDER_1 | FOLDER | | FOLDER A | | | | |
| FOLDER_3 | FOLDER_1 | FOLDER | | FOLDER B | | | | |
| DOCUMENT_001 | FOLDER_3 | DOCUMENT | | DOCUMENT A | | | | |
| DOCUMENT_002 | FOLDER_2 | DOCUMENT | | DOCUMENT B | | | | |
| DOCUMENT_003 | FOLDER_2 | DOCUMENT_LINK | DOCUMENT_001 | DOCUMENT A | | | ymd | 0 |

FIG. 21A1

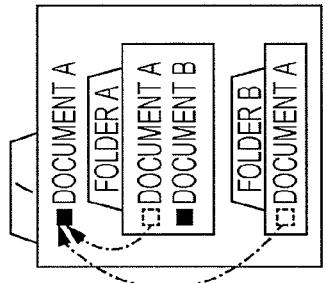

FIG. 21A2

| CONTENT IDENTIFIER | LOCATION IDENTIFIER | TYPE | LINK DESTINATION IDENTIFIER | NAME | DELETE | COMPRESS | DATE | COUNT |
|---|---|---|---|---|---|---|---|---|
| FOLDER_1 | | FOLDER | | / | | | | |
| FOLDER_2 | FOLDER_1 | FOLDER | | FOLDER A | | | | |
| FOLDER_3 | FOLDER_1 | FOLDER | | FOLDER B | | | | |
| DOCUMENT_001 | FOLDER_1 | DOCUMENT | | DOCUMENT A | | | | |
| DOCUMENT_002 | FOLDER_2 | DOCUMENT | | DOCUMENT B | | | | |
| DOCUMENT_003 | FOLDER_2 | DOCUMENT_LINK | DOCUMENT_001 | DOCUMENT A | | | ymd | n |
| DOCUMENT_004 | FOLDER_3 | DOCUMENT_LINK | DOCUMENT_001 | DOCUMENT A | | | ymd | 0 |

FIG. 21B1

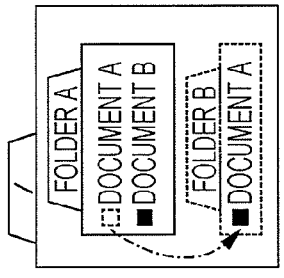

FIG. 21B2

| CONTENT IDENTIFIER | LOCATION IDENTIFIER | TYPE | LINK DESTINATION IDENTIFIER | NAME | DELETE | COMPRESS | DATE | COUNT |
|---|---|---|---|---|---|---|---|---|
| FOLDER_1 | | FOLDER | | / | | | | |
| FOLDER_2 | FOLDER_1 | FOLDER | | FOLDER A | | | | |
| FOLDER_3 | FOLDER_1 | FOLDER | | FOLDER B | | ✓ | | |
| DOCUMENT_001 | FOLDER_1 | DOCUMENT | | DOCUMENT A | | ✓ | | |
| DOCUMENT_002 | FOLDER_2 | DOCUMENT | | DOCUMENT B | | | | |
| DOCUMENT_003 | FOLDER_2 | DOCUMENT_LINK | DOCUMENT_001 | DOCUMENT A | | | ymd | 0 |

FIG. 22B

| CONTENT IDENTIFIER | LOCATION IDENTIFIER | TYPE | LINK DESTINATION IDENTIFIER | NAME | DELETE | DATE | COUNT |
|---|---|---|---|---|---|---|---|
| FOLDER_1 | | FOLDER | | / | | | |
| FOLDER_2 | FOLDER_1 | FOLDER | | FOLDER A | | | |
| FOLDER_3 | FOLDER_1 | FOLDER | | FOLDER B | | | |
| DOCUMENT_001 | FOLDER_1 | DOCUMENT | | DOCUMENT A | | | |
| DOCUMENT_002 | FOLDER_2 | DOCUMENT | | DOCUMENT B | | | |
| DOCUMENT_003 | FOLDER_2 | DOCUMENT_LINK | DOCUMENT_001 | DOCUMENT A | | | |
| DOCUMENT_004 | FOLDER_3 | DOCUMENT_LINK | DOCUMENT_001 | DOCUMENT A | | | |
| MAIL_001 | FOLDER_1 | MAIL | | MAIL A | | | |
| DOCUMENT_005 | FOLDER_3 | DOCUMENT | MAIL_001 | DOCUMENT C | | | |

FIG. 22A

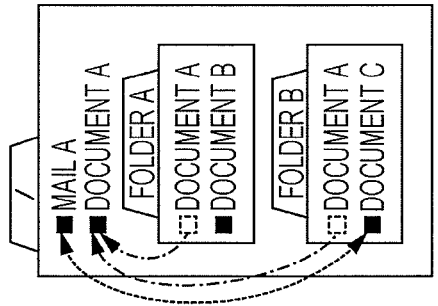

US 8,515,913 B2

FILE MANAGEMENT APPARATUS, FILE MANAGEMENT METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2011-010014 filed Jan. 20, 2011.

BACKGROUND

(i) Technical Field

The present invention relates to a file management apparatus, a file management method, and a computer readable medium storing a program for managing a file.

SUMMARY

According to an aspect of the invention, there is provided a file management apparatus. The file management apparatus includes a register unit that, with a link file pointing to a file generated, registers on a memory a first information set mapping the generated link file to the file and registers on the memory a second information set indicating a storage location of the file if the file is newly stored or if the link file pointing to the file is generated, a processor unit that, with any link file accessed, performs a process to determine a storage location of a file pointed to by the accessed link file in accordance with the first information set and the second information set registered on the memory, and a process to access the file stored at the determined storage location, and an update unit that, with the file mapped to the link file by the first information set registered on the memory being moved in storage location, updates the second information set indicating the storage location of the file such that the second information set indicates a storage location of the file subsequent to the movement of the file.

BRIEF DESCRIPTION OF THE DRAWINGS

Exemplary embodiments of the present invention will be described in detail based on the following figures, wherein:

FIGS. 8A1 through 8D1 illustrate statuses of files and

FIGS. 8A2 through 8D2 illustrate contents of a file management database (DB);

FIGS. 9A1 through 9C1 illustrate statuses of files and

FIGS. 9A2 through 9C2 illustrate contents of the file management DB;

FIG. 19 is a flowchart illustrating a process of the second exemplary embodiment performed when a link file is managed;

FIGS. 20A1 through 20C1 illustrate statuses of files and

FIGS. 20A2 through 20C2 illustrate contents of a file management DB;

FIGS. 21A1 and 21B1 illustrate statuses of files and

FIGS. 21A2 and 21B2 illustrate contents of the file management DB; and

FIG. 22A illustrates statuses of files and

FIG. 22B illustrate contents of the file management DB.

DETAILED DESCRIPTION

Exemplary embodiments of the invention are described with reference to the drawings.

First Exemplary Embodiment

Figure 1:
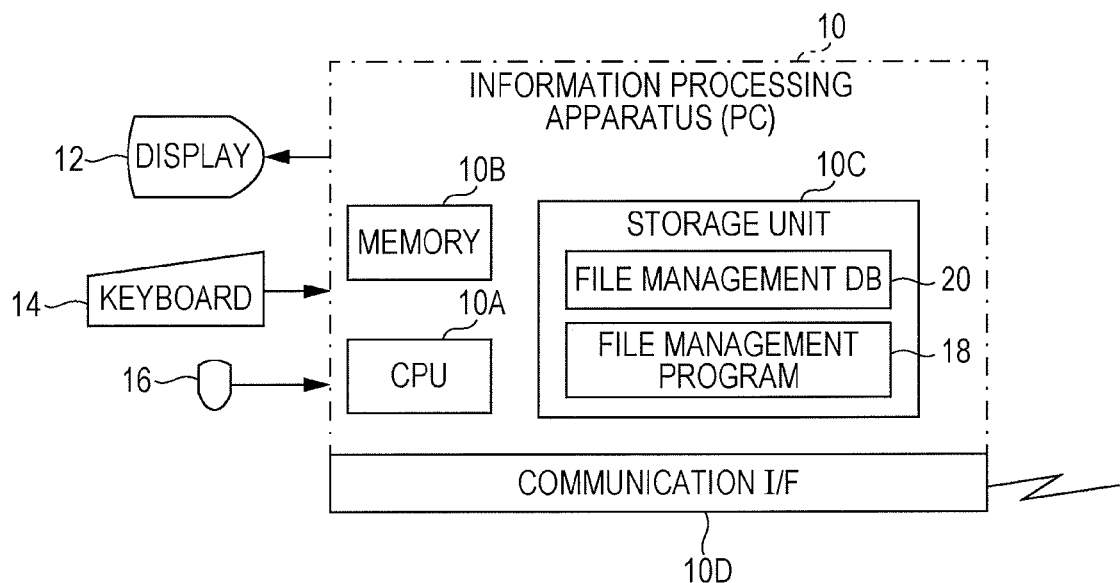
FIG. 1 is a block diagram diagrammatically illustrating an information processing apparatus of a first exemplary embodiment.

FIG. 1 illustrates an information processing apparatus 10 of a first exemplary embodiment. The information processing apparatus 10 may be a personal computer (PC), and includes a central processing unit (CPU) 10A, a memory 10B including a read-only memory (ROM), and a random-access memory (RAM), a non-volatile storage unit 10C including a hard disk drive (HDD) or a flash memory, and a communication interface (I/F) 10D. The information processing apparatus 10 connects to a display 12 as a display unit, a keyboard 14 and a mouse 16, each as an input unit. The information processing apparatus 10 also connects to a communication network (not illustrated), such as the Internet or an intranet, via the communication I/F 10D.

Installed on the storage unit 10C of the information processing apparatus 10 are a program (not illustrated) as an operating system (OS), a variety of application programs (not illustrated), and a file management program 18. The storage unit 10C stores a file management database (DB) 20. The file management program 18 manages a variety of files stored on the storage unit 10C. The file management program 18 is an example of a file management program of an exemplary embodiment of the invention. With the CPU 10A executing the file management program 18, the information processing apparatus 10 performs a process at a new storage of file, a process at a file movement, a process at a file name change, a process at a file deletion, a process at a folder compression, and a process at a link selection. The information processing apparatus 10 thus functions as a file management apparatus as an exemplary embodiment of the invention. The file management DB 20 registers information used for the file management program 18 to manage a variety of files.

Figure 2:
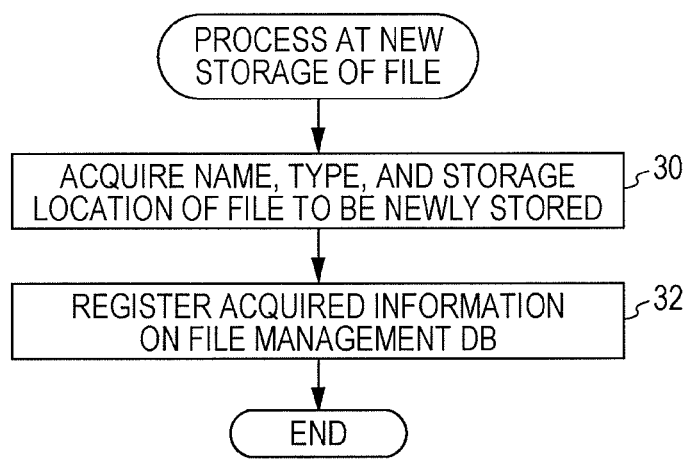
FIG. 2 is a flowchart illustrating a new storage process of a file of the first exemplary embodiment.

A first exemplary embodiment is described below. According to the first exemplary embodiment, a root folder (folder having a name "/") is arranged on a recording area of the storage unit 10C of the information processing apparatus 10 as illustrated in FIGS. 8A1 and 8A2. The root folder includes a file storage region storing a variety of files (including a document file, an image file, an audio file, a link file pointing to a particular file (as described later)). A user of the information processing apparatus 10 may store a desired number of folders having any desired names in the file storage region of the root folder. As illustrated in FIGS. 8A1 and 8A2, the root folder includes a folder having a name of "folder A" and a folder having a name of "folder B." Each of the folders produced in the root folder also serves as a file storage region.

The file management DB 20 registers therein management information of the contents (including a folder and a file) present in the file storage regions on a per content basis. As illustrated in FIG. 8A2, management information on the file management DB 20 of the first exemplary embodiment includes, on a per content basis of information, "location," "type," "link destination," "name," and "delete" flag. The "link destination" and the delete flag are set if a content of the management information is a link file. Set as the "location" is information representing an address in the file storage region with respect to the root folder. Set as the "link destination" in the first exemplary embodiment is information representing a storage location of a file as a link destination (an address of the storage location of the file with respect to the root folder), and a name of the file at the link destination.

Each time any change (such as an addition or a movement of a content, a name change, and a deletion) takes places in the content of the file storage region, an operating system (OS) starts up a file management program, and performs processes described below. For example, FIG. 8A1 illustrates the state of the file in which the folders A and B are generated in the root folder and FIG. 8A2 illustrates that the management information of the root folder, and the folders A and B is registered on the file management DB 20. The symbol "/" of the "location" of the management information of each of the folders A and B indicates that the folders A and B are present within the root folder. With the CPU 10A executing the file management program, the information processing apparatus 10 performs the processes as described below.

A process at a new storage of a file illustrated in FIG. 2 is performed when the OS starts the file management program in response to the new storage of the file at any location within the file storage region. In step 30, the CPU 10A acquires, from the OS, information of the name, the type, and the storage location of the file newly stored at any location within the file storage region. In step 32, the CPU 10A additionally registers the information acquired in step 30 on the file management DB 20, and the process at the new storage of the file is thus complete.

Through the process at the new storage of the file, the CPU 10A has newly stored the document A and the document B in the folder A as illustrated in FIG. 8B1. The management information registered on the file management DB 20 includes "/folder A/" representing the folder A set at the "location" and "DOCUMENT" representing a document set at the "type."

Figure 3:
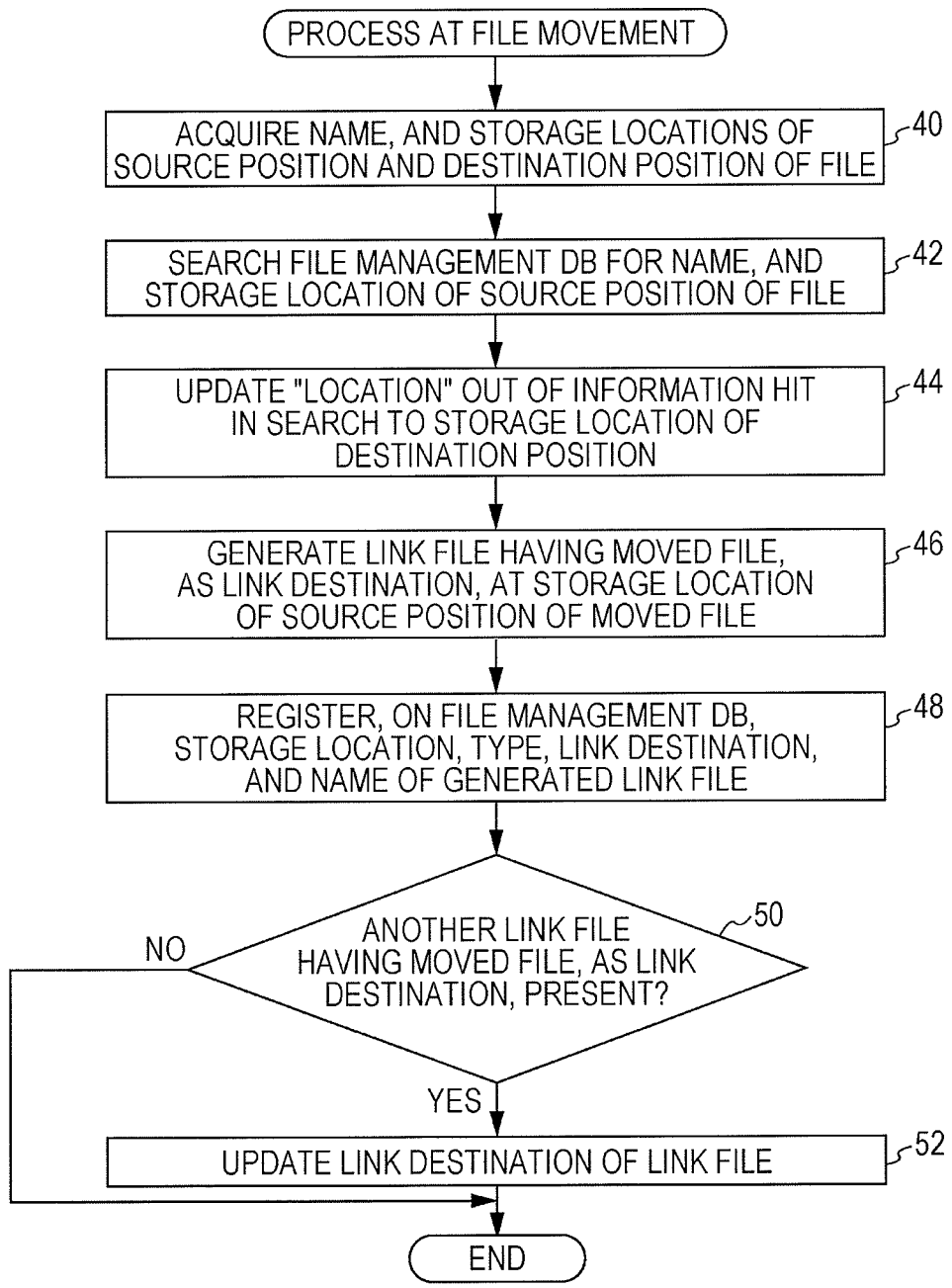
FIG. 3 is a flowchart illustrating a process of the first exemplary embodiment performed when a file is moved.

A process at a file movement of FIG. 3 is performed when the OS starts the file management program in response to a movement of any file in storage location in the file storage region. In step 40, the CPU 10A acquires from the OS information of a file name, and a storage location as a source position and a storage location as a destination position of a file moved in storage location. In step 42, the CPU 10A searches the file management DB 20 for the name and the storage location as the source position of the moved file of the information acquired in step 40. In step 44, the CPU 10A updates the "location" of the management information extracted from the file management DB 20 in step 42 (the management information of the moved file) to information representing the storage location as the destination position acquired in step 40.

In step 46, the CPU 10A generates a link file at the storage location as the source position of the moved file. The link file points to the file moved in storage location (with a link destination to the file moved in storage location). Step 46 is an example of a process performed by a generator unit. In step 48, the CPU 10A registers, as the management information of the link file generated in step 46 on the file management DB 20, information including the storage location as the source position of the file set at the "location," information, representing that the file is a link file, set at the "type," information representing the storage location and the name of the file at the link destination set at the "link destination," and the same name as the name of the file at the link destination set at the "name."

Step 48 is an example of a process of a register unit in the exemplary embodiments of the invention. In the first exemplary embodiment of the invention, the management information of the link file is an example of a first information set and the "link destination" in the management information of the link file is an example of a second information set.

In step 50, the CPU 10A searches the file management DB 20 to determine whether the management information of another link file having as a link destination the file moved in storage location is registered on the file management DB 20 and thus to determine whether such a link file is present. The search in step 50 is carried out by searching the file management DB 20 for the management information where information pointing to the file prior to the movement is set at the "link destination." If no other link file is present, the determination in step 50 is non-affirmative. The process at the file movement is complete.

If another link file is present, the determination in step 50 is affirmative, and processing proceeds to step 52. The CPU 10A thus updates the "link destination" of the management information of the other link file to information pointing to the file moved in storage location (information representing the storage location and the name of the moved file at the link destination). The process at the file movement is complete. Step 52 is an example of a process of an update unit in the exemplary embodiments of the invention.

Through the process at the file movement, the CPU 10A moves the document A out of the documents A and B stored in the folder A to the folder B as illustrated in FIG. 8C1. The "location" of the management information of the document A is modified from "/folder A/" indicating that the document A is present in the folder A to "/folder B/" indicating the document A is present in the folder B as illustrated in FIG. 8C2. A link file pointing to the document A is generated in the folder A that is the storage location prior to the movement of the document A. The CPU 10A additionally registers on the file management DB 20, as the management information of the link file, information including "/folder A/" indicating that the file is within the folder A set at the "location," "DOCUMENT_LINK" indicating the link file pointing to the document set at the "type," "/folder B/document A" indicating the storage location and the name of the document A set at the "link destination," and the "document A" set at the "name."

The document A may be further moved from the folder B to the root folder as illustrated in the state shifting from the state of FIG. 8C1 to the state of FIG. 8D1. The process at the file movement is performed again. The "location" of the management information of the document A is modified from "/folder B/" indicating that the document A is present in the folder B to "/" indicating the document A is present in the root folder. A link file pointing to the document A is generated in the folder B that is the storage location prior to the movement of the document A. The CPU 10A additionally registers on the file management DB 20, as the management information of the link file, management information including "/folder B/" indicating that the file is within the folder B, set at the "location," "DOCUMENT_LINK" indicating the link file pointing to the document set at the "type," "/document A," indicating the storage location and the name of the document A, set at the "link destination," and the "document A" set at the "name." Since the link file pointing to the document A is also present in the folder A, the determination in step 50 is affirmative in the process at the file movement (FIG. 3). The "link destination" of the management information of the link file is also modified from the original "/folder B/document A" to "/document A."

Each time any file stored on the file storage region is moved in storage location, a link file having the moved file as a link destination is generated at the storage location of the file prior to the file movement. The "link destination" of the management information of another link file having as a link destination the moved file is modified to information representing the storage location and the name of the moved file.

Figure 4:
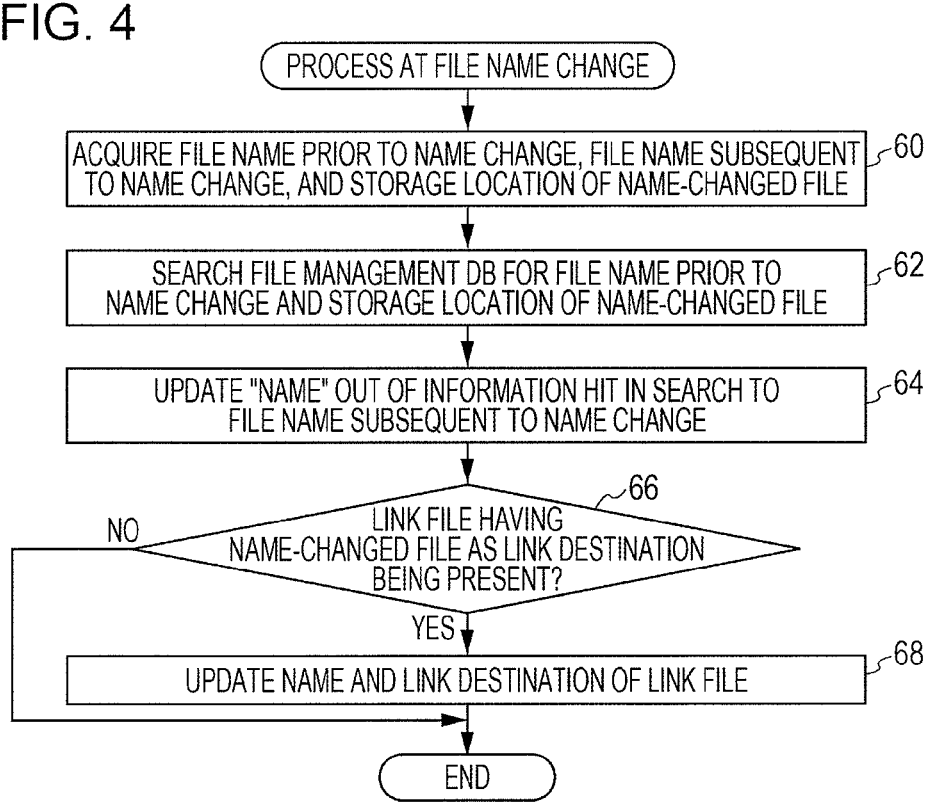
FIG. 4 is a flowchart illustrating a process of the first exemplary embodiment performed when a file name is changed.

If any file stored in the file storage region is changed in name, the OS starts up the file management program. A process at a file name change of FIG. 4 is performed. In the process at the file name change, the CPU 10A acquires from the OS information including the file name prior to name change, the file name subsequent to the name change, and the storage location of the name-changed file in step 60. In step 62, the CPU 10A searches the file management DB 20 for the file name prior to the name change and the storage location of the name-changed file out of the information acquired in step 60. In step 64, the CPU 10A updates the "name" of the management information hit in the search in step 62 and extracted from the file management DB 20 (the management information of the name-changed file) to the name subsequent to the name change.

In step 66, the CPU 10A searches the file management DB 20 to determine whether the management information of a link file having as a link destination the name-changed file is registered on the file management DB 20 and thus to determine whether such a link file is present. The search in step 66 may be performed by searching for the management information where information representing the storage location and the name of the file prior to the name change is set at the "link destination." If no such a link file is present, the determination in step 66 is non-affirmative, and the process at the file name change is complete. If such a link file is present, the determination in step 66 is affirmative. Processing proceeds to step 68. The CPU 10A thus updates the "link destination" of the management information of the link file to the information representing the storage location and the name of the name-changed file, and modifies the "name" to the name of the name-changed file. The process at the file name change is complete. Steps 66 and 68 are an example of the process to be performed by the update unit.

The name of the document A stored in the root folder is changed from "document A" to "document C" as illustrated in the state shifting from the state of FIG. 8D1 to the state of FIG. 9A1. The "name" of the management information of the original document A is modified from "document A" to "document C." The link file pointing to the document A prior to the name change is present in the folders A and B. Out of the management information of the link files, the "link destination" is modified from "/document A" representing the storage location and the name of the document A in the root folder to "/document C" representing the storage location and the name of the document C in the root folder, and the "name" is modified from "document A" to "document C."

Figure 5:
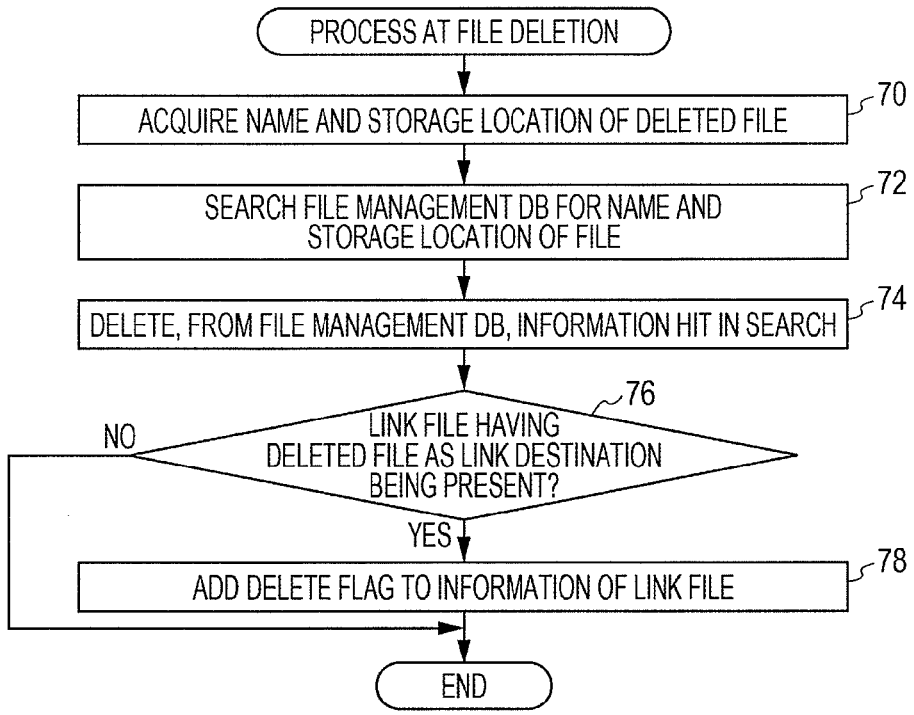
FIG. 5 is a flowchart illustrating a process of the first exemplary embodiment performed when a file is deleted.

If any file is deleted from the file storage region, the OS starts up the file management program in response. A process at a file deletion of FIG. 5 is performed. In the process at the file deletion, the CPU 10A acquires the name and the storage location of the deleted file from the OS in step 70. In step 72, the CPU 10A searches the file management DB 20 for the name and the storage location of the file acquired in step 70. In step 74, the CPU 10A deletes from the file management DB 20 the management information hit on the file management DB 20 in step 72 (the management information of the deleted file).

In step 76, the CPU 10A searches the file management DB 20 to determine whether the management information of a link file having the deleted file as a link destination is registered on the file management DB 20 and to determine whether such a link file is present. The search in step 76 may be performed by searching for the management information where information representing the storage location and the name of the deleted file is set at the "link destination." If no such a link file is present, the determination in step 76 is non-affirmative, and the process at the file deletion is complete. If such a link file is present, the determination in step 76 is affirmative. Processing proceeds to step 78. The CPU 10A thus adds to the management information of the link file a delete flag representing that the file as the link destination has been deleted. The process at the file deletion is complete.

The document A stored in the root folder A may be deleted in the process at the file deletion as illustrated in the state shifting from the state of FIG. 8D1 to the state of FIG. 9B1. The management information of the document A is thus deleted from the file management DB 20. The link files pointing to the document A are respectively present in the folders A and B. The management information of these files is not deleted from the information processing apparatus 10 and delete flags are respectively attached thereto.

Figure 6:
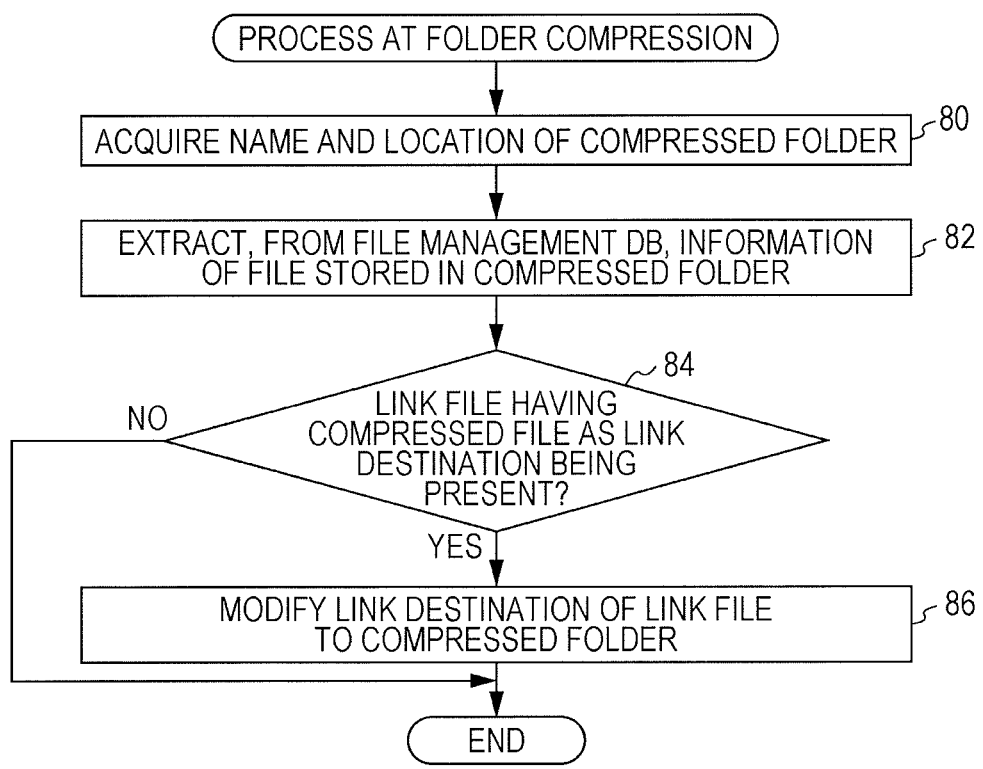
FIG. 6 is a flowchart illustrating a process of the first exemplary embodiment performed when a folder is compressed.

If any folder present in the file storage region is compressed together with a file stored in the folder, the OS starts up the file management program in response. The CPU 10A performs a process at a folder compression of FIG. 6. The process at the folder compression of FIG. 6 is an example of the process of the update unit. The CPU 10A acquires a name and a location of a compressed folder from the OS in step 80. In step 82, the CPU 10A searches for the management information of the file stored in the compressed folder (the management information where the compressed folder is set at the "location" and the "type" is neither FOLDER nor "xxx_LINK"), and then extracts such management information from the file management DB 20 as the management information of the file stored in the compressed folder.

In step 84, the CPU 10A searches the file management DB 20 to determine whether the management information of a link file having as a link destination the file having the management information extracted in step 82 (the file stored in the compressed folder) is registered on the file management DB 20 and thus to determine whether such a link file is present. The search in step 84 may be performed by searching for the management information where information representing the storage location and the name of the file stored in the compressed folder is set at the "link destination." If no such a link file is present, the determination in step 84 is non-affirmative, and the process at the folder compression is complete. If such a link file is present, the determination in step 84 is affirmative. Processing proceeds to step 86. The CPU 10A modifies the "link destination" of the management information of the link file to information representing the location and the name of the compressed folder. The process at the folder compression is complete.

Through the process at the folder compression, the CPU 10A compresses the folder B storing the document A together with the document A as illustrated in the state shifting from the state of FIG. 8C1 to the state of FIG. 9C1. As illustrated in FIG. 9C2, the "link destination" of the management information of the link file pointing to the document A in the folder A is modified from "/folder B/document A" representing the storage location and the name of the document A to "/folder B" representing the location and the name of the folder B.

Figure 7:
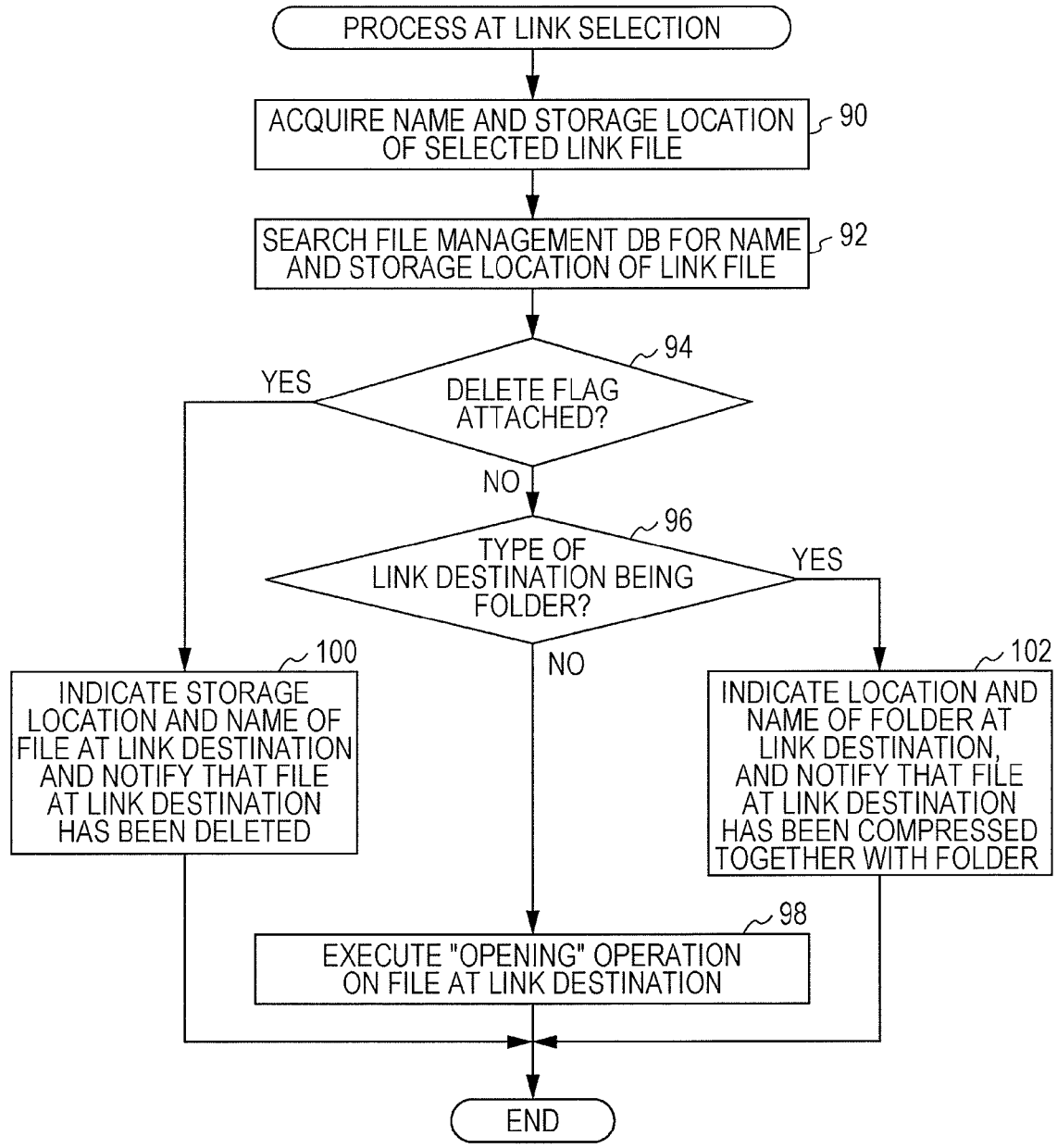
FIG. 7 is a flowchart illustrating a process of the first exemplary embodiment performed when a link is selected.

If a user performs an operation to select any link file in the file storage region, the OS starts up the file management program in response. A process at a link selection of FIG. 7 is performed. The process at the link selection is an example of the process of a processor unit. In step 90, the CPU 10A acquires, from the OS, information of a name and a storage location of a link file selected by the user. In step 92, the CPU 10A searches the file management DB 20 for the name and the storage location of the link file acquired in step 90.

In step 94, the CPU 10A determines whether a delete flag has been attached to the management information extracted from the file management DB 20 in the search in step 92 (the management information of the link file selected by the user). If the determination in step 94 is affirmative, the file pointed to by the link file selected by the user has been deleted. Processing proceeds to step 100. The CPU 10A displays on the display 12 the storage location (immediately prior to the deletion) and the name of the file as the link destination indicated by the "link destination" of the management information of the link file selected by the user. The CPU 10A also displays on the display 12 a message notifying the user that the file as the link destination has been deleted. The process at the link selection is complete. The user thus recognizes that the file pointed to by the link file selected by the user has been deleted.

If the determination in step 94 is non-affirmative, processing proceeds to step 96. The CPU 10A references the management information of the content at the link destination of the link file selected by the user, and then determines whether the "type" of the management information of the content at the link destination is "FOLDER." If the determination in step 96 is affirmative, the file pointed to by the link file selected by the user has been compressed together with the folder. Processing proceeds to step 102. The CPU 10A displays on the display 12 the location and the name of the folder at the link destination represented by the "link destination" of the management information of the link file selected by the user. The CPU 10A also displays on the display 12 a message notifying the user that the file pointed to by the link file has been compressed with the folder. The process at the link selection is complete. The user thus recognizes that the file pointed to by the link file has been compressed with the folder.

If the determination in step 96 is non-affirmative, processing proceeds to step 98. The CPU 10A accesses the file pointed to by the link file selected by the user, and performs an "opening" operation of the file (an operation to open the file with an application program mapped to the format of the file pointed to by the link file). The process at the link selection is complete. The CPU 10A may perform a process of notifying the user by displaying on the display 12 the storage location of the file pointed to by the link file, or may perform a process of opening the folder storing the file pointed to by the link file.

According to the first exemplary embodiment, each time the file is moved to another storage location, the "link destination" of the management information of the link file pointing to the file moved in storage location is modified to information representing the storage location and the name of the file subsequent to the movement. Even if the storage location of the file at the link destination is changed by plural times, each link file is maintained in a state directly pointing to the file at the link destination. If the file is changed in name, the "link destination" of the management information of the link file pointing to the name-changed file is modified to the information representing the name of the storage location and the name of the file subsequent to the name change. Even if the name of the file at the link destination is changed, the link file remains directly pointing to the file at the link destination.

Second Exemplary Embodiment

A second exemplary embodiment of the invention is described below. The same elements identical to those in the first exemplary embodiment are designated with the same reference numerals and the discussion thereof is omitted herein.

Figure 10:
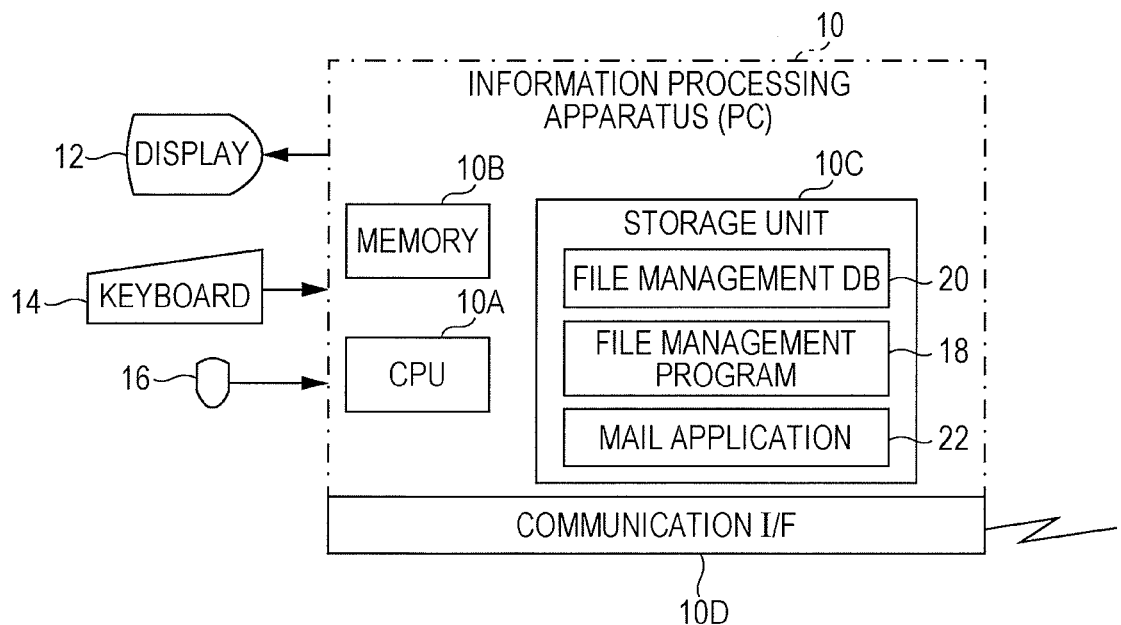
FIG. 10 is a block diagram diagrammatically illustrating an information processing apparatus of a second exemplary embodiment.
Figure 12:
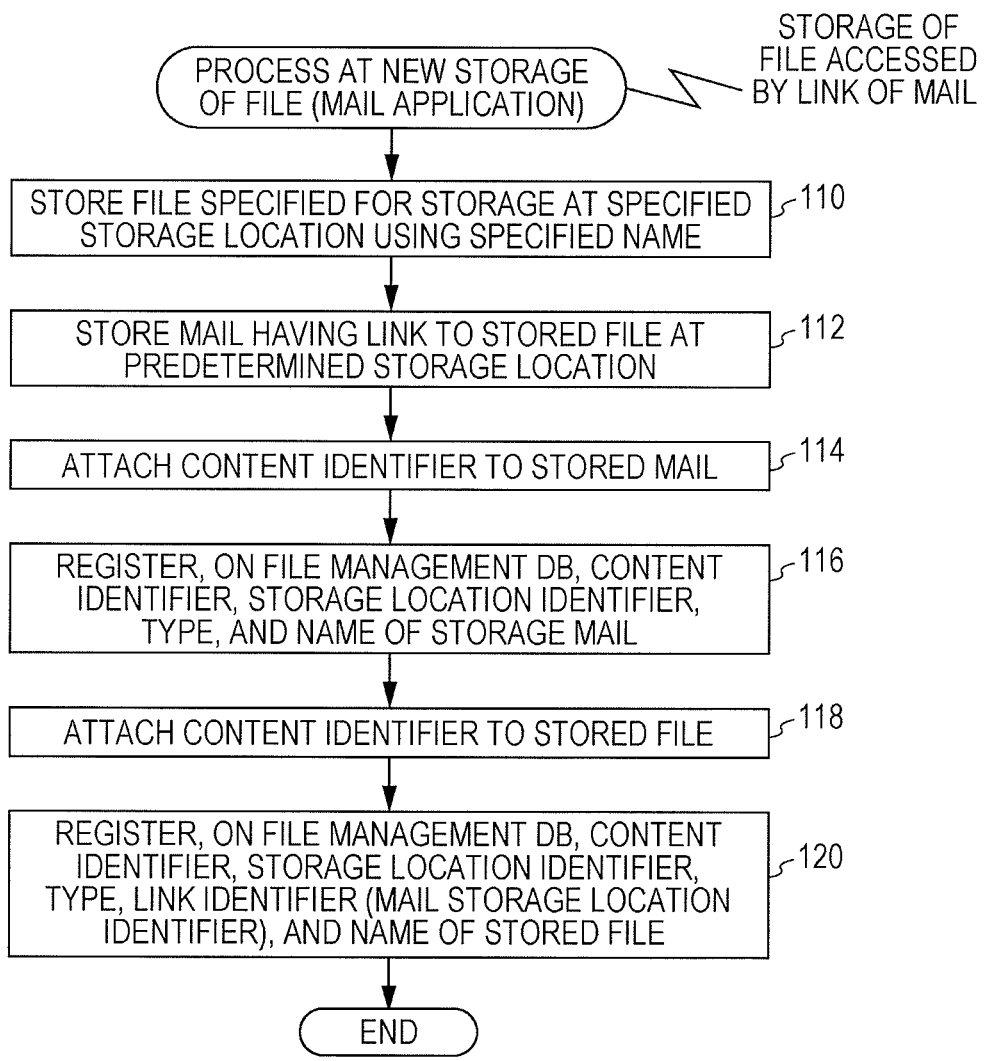
FIG. 12 is a flowchart illustrating a process of the second exemplary embodiment performed when a file is newly stored in accordance with a mail application program.

FIG. 10 illustrates an information processing apparatus 10 of the second exemplary embodiment. Installed on a storage unit 10C of the information processing apparatus 10 is a mail application program 22 in addition to the file management program 18. The mail application program 22 is used to send and receive electronic mails, acquire and store a file through downloading if an instruction to store the file pointed to by a link described within a body of an electronic mail is placed, and perform a new storage process of a file to be discussed later (FIG. 12). The information processing apparatus 10 performs the processes with the CPU 10A performing the mail application program 22.

The second exemplary embodiment is described below. According to the second exemplary embodiment, unique content identifiers are respectively attached to contents (such as folders including the root folder and files) present in the file storage region to identify the contents. Set as the management information of each content on the file management DB 20 of the second exemplary embodiment as illustrated in FIGS. 20A1 and 20A2 are a "content identifier," a "location identifier," a "type," a "link destination identifier," a "name," a "delete" flag, a "compress" flag, a "date" of registration on DB, and an (access) "count." If the content is a link file, the "link destination identifier," the "date," the "count" and the delete flag are set. If the content is a folder or a file, the compress flag is set. According to the second exemplary embodiment, only the content identifier of a target content is set at the "location identifier," and the "link destination."

As illustrated in FIG. 20A1, the folders A and B are produced within the root folder in the same manner as in FIG. 8A1. The management information of the root folder, and the folders A and B is registered on the file management DB 20.

As illustrated in FIG. 20A2, "FOLDER_1" as a content identifier is attached to the root folder, "FOLDER_2" as a content identifier is attached to the folder A, and "FOLDER_3" as a content identifier is attached to the folder B. "FOLDER_1" as a content identifier of the root folder is set to the folders A and B as a location identifier.

Figure 11:
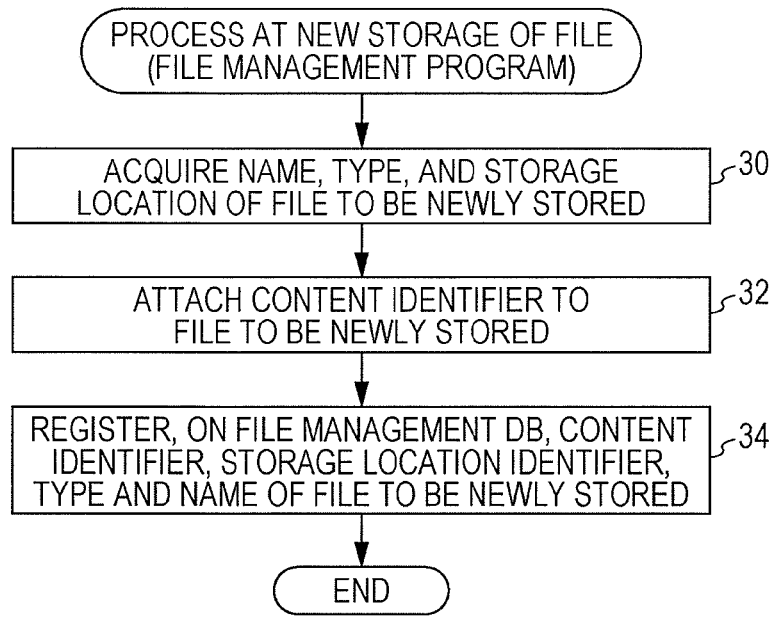
FIG. 11 is a flowchart illustrating a process of the second exemplary embodiment performed when a file is newly stored in accordance with a file management program.

According to the second exemplary embodiment, any file may be newly stored at any location in the file storage region. The OS then starts up the file management program in response. A process at a new storage of the file of FIG. 11 is performed. In the process at the new storage of the file of FIG. 11, the CPU 10A acquires from the OS the name, the type, and the storage location of the file stored at any location in the file storage region in step 30.

In step 32, the CPU 10A attaches a content identifier to the newly stored file. The content identifier to be attached in step 32 is determined such that the content identifier does not duplicate any content identifier already attached to a file of the same type. In step 34, the CPU 10A converts the storage location acquired in step 30 to the content identifier attached to the storage location, in accordance with the information stored on the file management DB 20. The CPU 10A thus additionally registers, as the management information of the newly stored file, on the file management DB 20 information including the content identifier attached in step 32 set at the "content identifier," the content identifier corresponding to the storage location set at the "location identifier", and the type and the name acquired in step 30 set at the "type," and the "name." The process at the new storage of the file is thus complete.

The CPU 10A thus newly stores the document A and the document B in the folder A through the process at the new storage of the file as illustrated in FIG. 20B1. The management information of the newly stored document A registered on the file management DB 20 includes "DOCUMENT_001" set at the "content identifier," "FOLDER_2" as the content identifier of the folder A set at the "location identifier," "DOCUMENT" set at the "type," and the "document A" set at the "name." The management information of the newly stored document B registered on the file management DB 20 includes "DOCUMENT_002" set at the "content identifier," "FOLDER_2" as the content identifier of the folder A set at the "location identifier," "DOCUMENT" set at the "type," and the "document B" set at the "name."

In the second exemplary embodiment, the management information of the link file of the information registered on the file management DB 20 is an example of the first information set and the management information of each folder and each file is an example of the second information set.

According to the second exemplary embodiment, the body of the electronic mail received by the mail application program 22 is displayed on the display 12 in response to an instruction from the user. In this condition, the user may select a link pointing to a particular file described in the body of the electronic mail, and place an instruction to store the particular file pointed to by the selected link at a storage location specified in the file storage region by a specified name. The mail application program 22 (the information processing apparatus 10 executing the mail application program 22) performs a process at a new storage of a file as illustrated in FIG. 12.

The process at the new storage of the file of FIG. 12 is an example of a process of the register unit. In step 110, the CPU 10A acquires the file, pointed to by the link selected by the user, by downloading the file from an address represented by address information embedded in the link. The CPU 10A stores the acquired file at a storage location specified by the user by a name specified by the user. In step 112, the CPU 10A stores, at a predetermined storage location (such as the root folder), the electronic mail having within the body thereof the link pointing to the file stored in step 110.

In step 114, the CPU 10A attaches a content identifier to the electronic mail stored in step 112. In step 116, the CPU 10A converts the predetermined storage location of the electronic mail to the content identifier attached to the storage location, in accordance with the information stored on the file management DB 20. The CPU 10A additionally registers on the file management DB 20, as the management information of the stored electronic mail, information including the content identifier attached in step 114 set at the "content identifier," the content identifier corresponding to the storage location set at the "location identifier," "MAIL" set at the "type," and the name of the stored electronic mail at the "name."

In step 118, the CPU 10A attaches a content identifier to the file stored in step 110. In step 120, the CPU 10A converts the storage location of the file stored in step 110 to the content identifier attached to the storage location, in accordance with the information stored on the file management DB 20. The CPU 10A thus additionally registers on the file management DB 20, as the management information of the file stored in step 110, information including the content identifier attached in step 118 set at the "content identifier," the content identifier corresponding to the storage location set at the "location identifier," the type and the name of the stored file set at the "type" and the "name," and the content identifier of the electronic mail set at the "link identifier." The process at the new storage of the file of FIG. 12 is complete.

Through the process at the new storage of the file, the document A is stored in the root folder, a link file pointing to the document A and the document B is stored in the folder A, and a link file pointing to the document A is stored in the folder B as illustrated in FIG. 22A. If an instruction to store in the folder B a document C pointed to by the link described in the body of the electronic mail (mail A) has been placed in the above condition, the document C is stored in the folder B, and the electronic mail (mail A) is stored at the predetermined storage location of the electronic mail (in the root folder in FIG. 22A).

The management information of the stored mail A registered on the file management DB 20 includes "MAIL_001" set at the "content identifier," "FOLDER_" as the content identifier of the root folder set at the "location identifier," "MAIL" set at the "type," and the "mail A" set at the "name." The management information of the stored document C on the file management DB 20 includes "DOCUMENT_005" set at the "content identifier," "FOLDER_3" as the content identifier of the folder B set at the "location identifier," "DOCUMENT" set at the "type," "MAIL_001" as the content identifier of the electronic mail set at the "link identifier" and the "document C" set at the "name."

Figure 13:
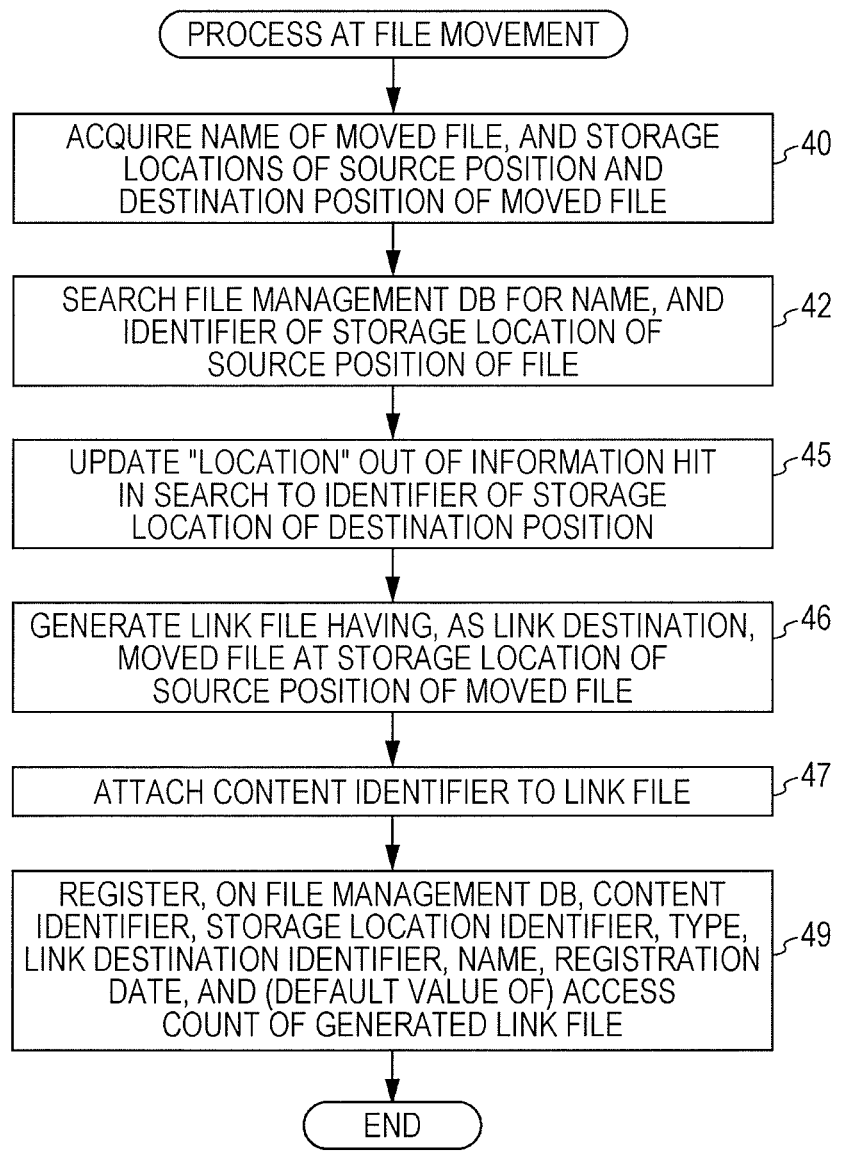
FIG. 13 is a flowchart illustrating a process of the second exemplary embodiment performed when a file is moved.

If any file is moved in storage location within the file storage region in the second exemplary embodiment, the OS starts up the file management program in response. A process at a file movement of FIG. 13 is performed. In step 40, the CPU 10A acquires from the OS information of a name of a file moved in storage location, storage locations of a source position and a destination position of the file.

In step 42, the CPU 10A converts the storage location of the source position acquired in step 40 into a content identifier attached to the storage location, in accordance with the information registered on the file management DB 20. The CPU 10A searches the file management DB 20 for the name of the file moved in storage location and the content identifier of the storage location of the source position of the file. In step 45, the CPU 10A converts the storage location of the destination position acquired in step 40 into the content identifier attached to the storage location, in accordance with the information registered on the file management DB 20. The CPU 10A updates the "location identifier" of the management information extracted from the file management DB 20 in step 42 (the management information of the file moved in storage location) to the identifier of the storage location of the destination position. Steps 40-45 are an example of a process of the update unit.

In step 46, the CPU 10A generates a link file pointing to the moved file (the link file having as a link destination the moved file). Step 46 is an example of a process of a generator unit.

In step 47, the CPU 10A attaches a content identifier to the generated link file. In step 49, the CPU 10A registers on the file management DB 20, as the management information of the link file generated in step 46, information including the content identifier generated in step 47 set at the "content identifier," the identifier of the storage location of the source position of the file moved in storage location set at the "location identifier," information representing the link file set at the "type," the content identifier of the file at the link destination set at the "link destination," and the same name as the name of the file at the link destination set at the "name." The process at the file movement is complete. Steps 47 and 49 are an example of the process of the register unit.

According to the second exemplary embodiment, the content identifier of the file at the link destination is set at the "link destination" of the management information registered on the file management DB 20. Even if the file at the link destination is moved in storage location, no modification is needed for the content identifier. The second exemplary modification is free from the process at the file movement (FIG. 3) of the first exemplary embodiment including searching for the management information of the other link file having as the link destination the moved file and updating the "link destination" of the management information of the link file.

As illustrated in FIGS. 20C1 and 20C2, the document A out of the documents A and B stored in the folder A is moved to the folder B through the process at the file movement. The "location identifier" of the management information of the document A is modified from "FOLDER_2" corresponding to the document A to "FOLDER_3" corresponding to the folder B. A link file pointing to the document A is generated in the folder A as the storage location of the document A prior to the movement. The CPU 10A additionally registers, as the management information of the link file on the file management DB 20, information including "DOCUMENT_003" as the content identifier of the link file set at the "content identifier," "FOLDER_2" corresponding to the document A set at the "location identifier," "DOCUMENT_LINK" representing the link file pointing to the document set at the "type," "DOCUMENT_001" as the content identifier of the document A set at the "link destination," and the "document A" set at the "name."

The document A is moved from the folder B to the root folder as illustrated in the shifting from the state of FIG. 20C1 to the state of FIG. 21A1. The process at the file movement is performed again. The "location identifier" of the management information of the document A is modified from "FOLDER_3" corresponding to the folder B to "FOLDER_1" corresponding to the root folder. A link file pointing to the document A is generated in the folder B as the storage location of the document A prior to the movement. The CPU 10A thus additionally registers on the file management DB 20, as the management information of the link file, information including "DOCUMENT_003" as the content identifier of the link file set at the "content identifier," "FOLDER_3" corresponding to the document B set at the "location identifier," "DOCUMENT_LINK" representing the link file pointing to the document set at the "type," "DOCUMENT_001" as the content identifier of the document A set at the "link destination," and the "document A" set at the "name." It is noted that the management information of the link file pointing to the document A present in the folder A is not modified.

Figure 14:
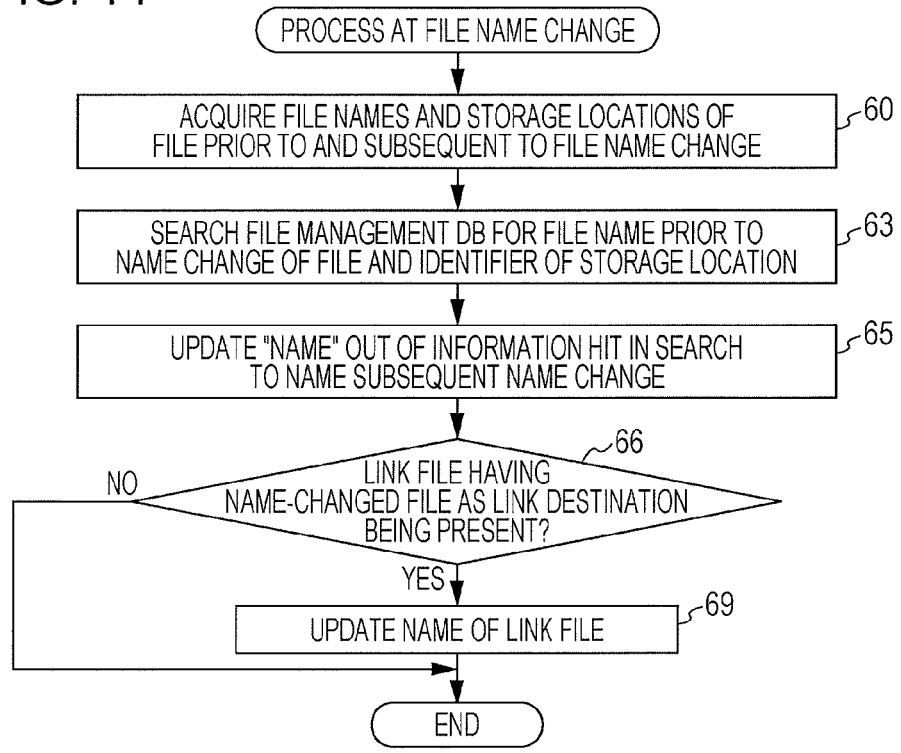
FIG. 14 is a flowchart illustrating a process of the second exemplary embodiment performed when a file name is changed.

According to the second exemplary embodiment, the OS starts up the file management program if any file stored in the file storage region is changed in name. A process at a file name change of FIG. 14 is performed. The process at the file name change of FIG. 14 is an example of the process of the update unit. In step 60, the CPU 10A acquires, from the OS, information of names and storage locations of the file prior to and subsequent a name change. In step 63, the CPU 10A converts the storage location acquired in step 60 to the content identifier attached to the storage location, in accordance with the information registered on the file management DB 20. The CPU 10A searches the file management DB 20 for the name of the file prior to the name change acquired in step 60 and the content identifier of the storage location. In step 65, the CPU 10A updates the "name" of the management information extracted from the file management DB 20 in the search in step 63 (the management information of the name-changed file) to the name subsequent to the name change.

In step 66, the CPU 10A searches the file management DB 20 to determine whether the management information of a link file having the name-changed file as a link destination has been registered and to determine whether such a file is present. The search in step 66 is performed by searching for the management information where the content identifier of the file at the link destination is set at the "link destination." If no such a link file is present, the determination in step 66 is non-affirmative. The process at the file name change is complete. If such a link file is present, the determination in step 66 is affirmative. Processing proceeds to step 69. The "name" of the management information of the link file is modified to the file name subsequent to the name change. The process at the file name change is complete.

The name of the file at the link destination is set in the management information of the file at the link destination. According to the second exemplary embodiment, the "name" may not be set in the management information of the link file. If the name is to be used, the name may be acquired by referencing the management information of the file at the link destination. In such a case, the search for the management information of the link file in step 66 may be omitted.

Figure 15:
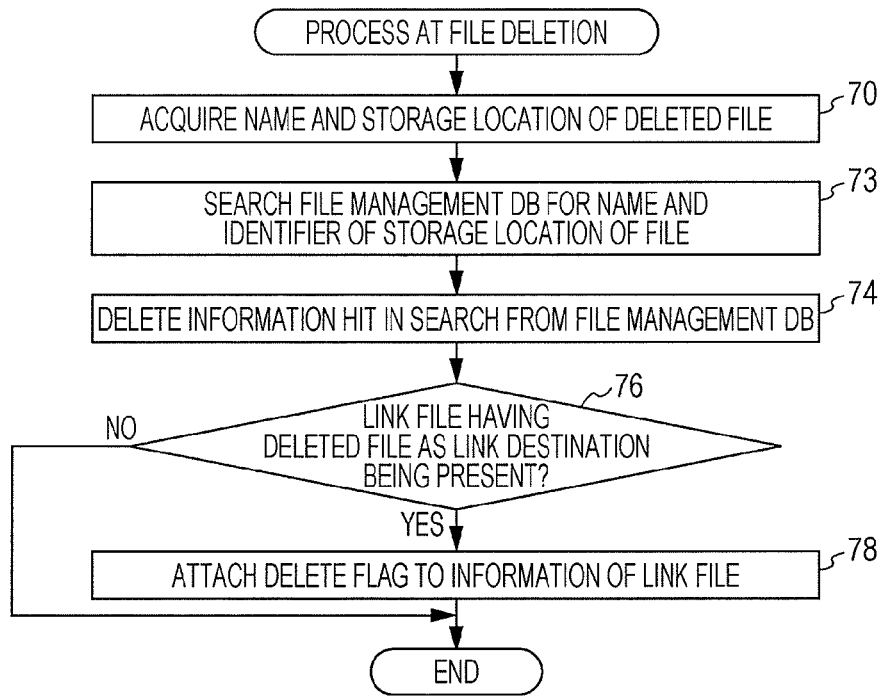
FIG. 15 is a flowchart illustrating a process of the second exemplary embodiment performed when a file is deleted.

According to the second exemplary embodiment, the OS starts up the file management program if any file is deleted from the file storage region. A process at a file deletion of FIG. 15 is performed. In the process at the file deletion, the CPU 10A acquires the name and the storage location of the deleted file from the OS in step 70. In step 73, the CPU 10A converts the storage location acquired in step 70 to the content identifier attached to the storage location, in accordance with the information registered on the file management DB 20. The CPU 10A searches the file management DB 20 for the name of the file acquired in step 70 and the content identifier of the storage location. In step 74, the CPU 10A deletes from the file management DB 20 the management information extracted from the file management DB 20 in step 73 (the management information of the deleted file).

In step 76, the CPU 10A searches the file management DB 20 to determine whether the management information of a link file having the deleted file as a link destination has been registered and thus to determine whether such a link file is present. The search in step 76 is performed by searching for the management information where the content identifier of the deleted file (the content identifier set in the management information deleted in step 74) is set at the "link destination." If no such a link file is present, the determination in step 76 is non-affirmative. The process at the file deletion is complete. If such a link file is present, the determination in step 76 is affirmative. Processing proceeds to step 78. The CPU 10A attaches to the management information of the link file a delete flag indicating that the file at the link destination has been deleted. The process at the file deletion is complete. Steps 76 and 78 are an example of the process of the update unit.

Figure 16:
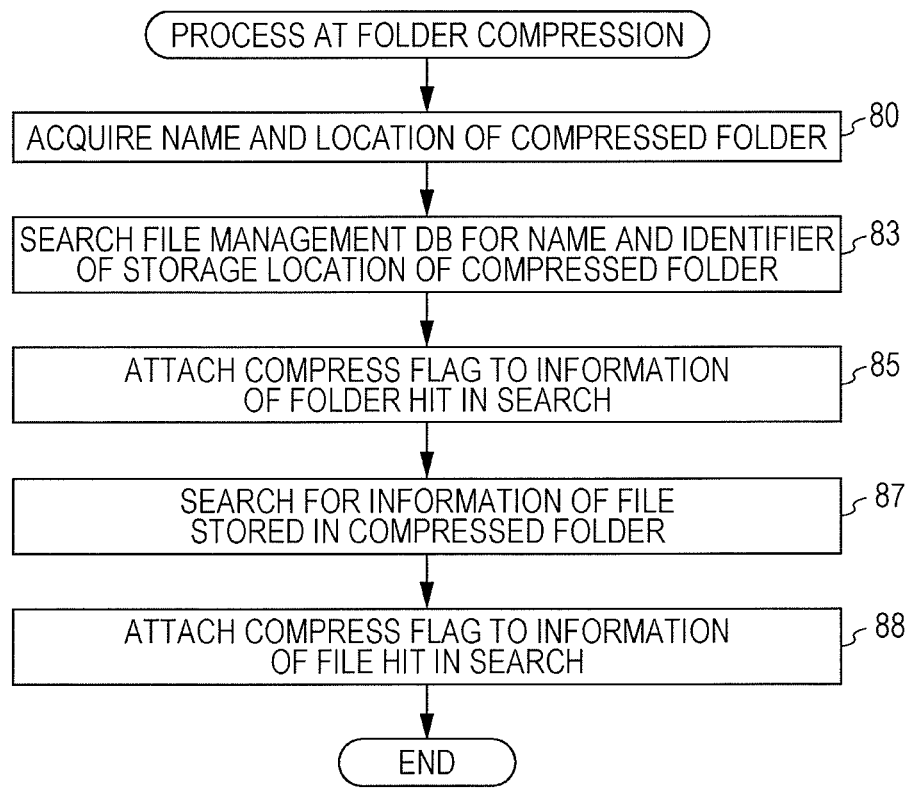
FIG. 16 is a flowchart illustrating a process of the second exemplary embodiment performed when a folder is compressed.

According to the second exemplary embodiment, the OS starts up the file management program if any folder in the file storage region is compressed together with a file in the folder. A process at a folder compression of FIG. 16 is performed. The process at the folder compression of FIG. 16 is an example of the process of the update unit. In step 80, the CPU 10A acquires from the OS the name and the location of the compressed folder. In step 83, the CPU 10A converts the location acquired in step 80 to the content identifier attached to the location, in accordance with the information registered on the file management DB 20. The CPU 10A searches the file management DB 20 for the name of the folder acquired in step 80 and the content identifier of the location. In step 85, the CPU 10A attaches a compress flag to the management information extracted from the file management DB 20 in step 83 (the management information of the compressed folder).

In step 87, the CPU 10A searches for the management information of the file stored in the compressed folder. The search in step 87 is performed by searching for the management information where the content identifier of the compressed folder is set as the "location identifier," and the "type" is neither "FOLDER," nor "***_LIN." In step 88, the CPU 10A attaches a compress flag to the management information extracted from the file management DB 20 in the search in step 85 (the management information stored in the compressed folder). The process at the folder compression is thus complete.

The folder B storing the document A is compressed together with the document A through the process at the folder compression as illustrated in the state shifting from the state of FIG. 20C1 to the state of FIG. 21B1. The compress flags are respectively attached to the management information of the folder B and the management information of the document A.

Figure 17:
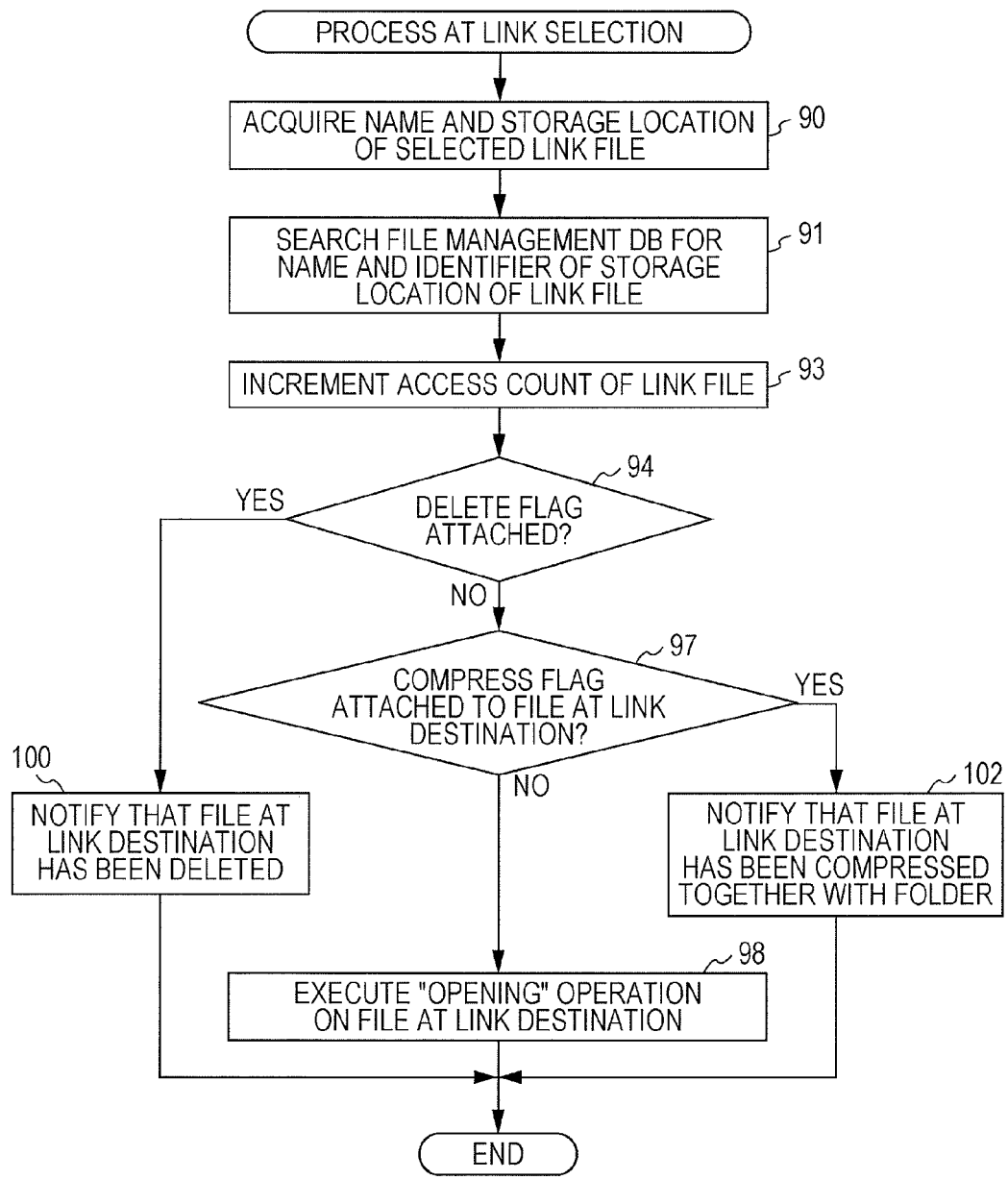
FIG. 17 is a flowchart illustrating a process of the second exemplary embodiment performed when a link is selected.

According to the second exemplary embodiment, the OS starts up the file management program if any link file in the file storage region is selected by the user. A process at a link selection of FIG. 17 is performed. The process at the link selection is an example of the process of the processor unit of the second exemplary embodiment of the invention. In step 90, the CPU 10A acquires, from the OS, information of a name and a storage location of a link file selected by the user.

In step 91, the CPU 10A converts the storage location acquired in step 90 to the content identifier attached to the storage location, in accordance with the information registered on the file management DB 20. The CPU 10A searches the file management DB 20 for the name of the link file acquired in step 90 and the content identifier of the storage location. In step 93, the CPU 10A increments by 1 a value (an access count to the link file) set in the "count" of the management information extracted from the file management DB 20 in step 91 (the management information of the link file selected by the user).

In step 94, the CPU 10A determines whether a delete flag is attached to the management information of the link file selected by the user. An affirmative determination in step 94 means that the file pointed to by the link file selected by the user has already been deleted. Processing proceeds to step 100. The CPU 10A displays on the display 12 a message notifying the user that the file at the link destination has been deleted. The process at the link selection is complete. The user recognizes that the file pointed to by the link file selected by the user has been deleted.

If the determination in step 94 is non-affirmative, processing proceeds to step 97. The CPU 10A searches the file management DB 20 for the content identifier set in the "link destination" of the management information of the link file selected by the user. The CPU 10A thus determines whether a compress flag has been attached to the management information of the file at the link destination hit in the search. An affirmative determination in step 97 means that the file pointed to by the link file selected by the user has been compressed together with the folder. Processing proceeds to step 102. The CPU 10A displays on the display 12 a message notifying the user that the file pointed to by the link file selected by the user has been compressed together with the folder. The process at the link selection is complete. In this way, the user recognizes that the file pointed to by the link file selected by the user has been compressed together with the folder.

If the determination in step 97 is non-affirmative, processing proceeds to step 98. The CPU 10A accesses the file pointed to by the link file selected by the user, and performs a file "opening" operation (an file opening operation opening the file with an application program mapped to the format of the file pointed to by the link file). The process at the link selection is complete. Alternatively, the file opening operation of the file pointed to by the link file may be substituted for by an operation of notifying the user through displaying on the display 12 the storage location of the file pointed to by the link file, or an operation of opening the folder storing the file pointed to by the link file.

Figure 18:
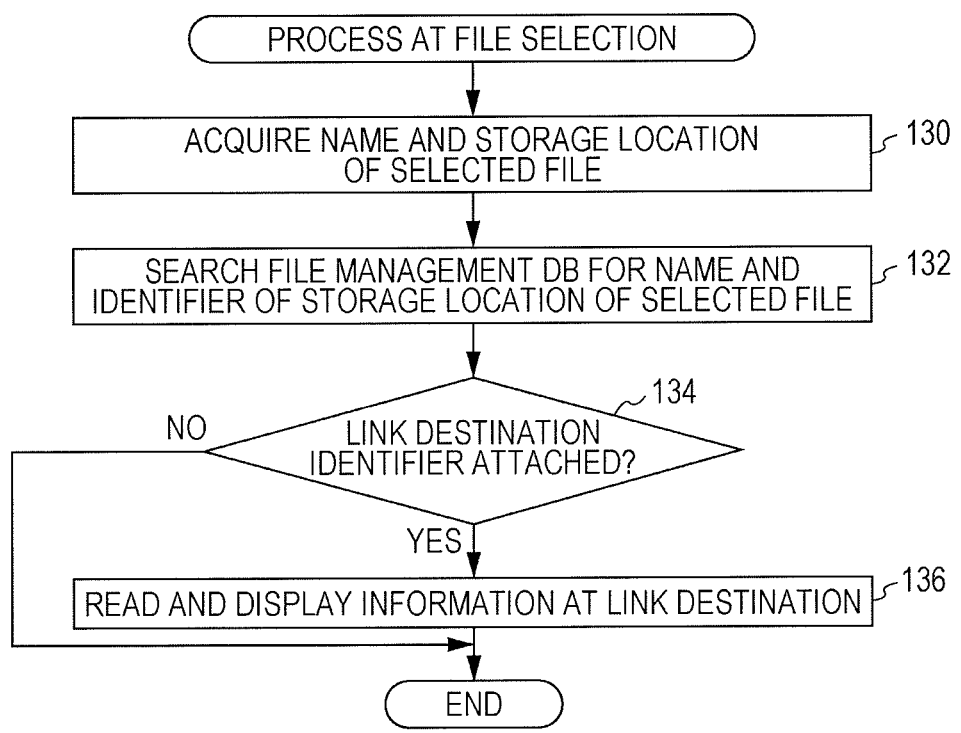
FIG. 18 is a flowchart illustrating a process of the second exemplary embodiment performed when a file is selected.

According to the second exemplary embodiment, the OS starts up the file management program if any file in the file storage region is selected by the user. A process at a file selection of FIG. 18 is performed. The process at the file selection is an example of the process of the processor unit. In step 130, the CPU 10A acquires, from the OS, information of a name and a storage location of a file selected by the user. In step 132, the CPU 10A converts the storage location acquired in step 130 to the content identifier attached to the storage location, in accordance with the information registered on the file management DB 20. The CPU 10A searches the file management DB 20 for the name of the file acquired in step 130 and the content identifier of the storage location.

In step 134, the CPU 10A determines whether the content identifier is set as the "link destination" in the management information hit in the search in step 132 (the management information of the file selected by the user). If the determination in step 134 is non-affirmative, the process at the file selection is complete. In such a case, the file selected by the user may be opened by an application program mapped to the file.

If the determination in step 134 is affirmative, the file selected by the user is determined as a file that has been stored through the process at the new storage of the file of FIG. 12 in accordance with the mail application program 22. (The file is stored by the user that selects a link pointing to a particular file and described in a body of an electronic mail and performs an operation to instruct the particular file pointed to by the selected link to be stored). Processing proceeds to step 136. The CPU 10A searches the file management DB 20 for the content identifier set at the "link destination" of the management information hit in the search in step 132. The CPU 10A displays on the display 12 predetermined information (such as a name and a storage location of an electronic mail) of the management information extracted in the search (the management information of the electronic mail mapped to the file selected by the user). The process at the file selection is complete. The user recognizes that the electronic mail mapped to the file selected by the user is present, and also recognizes the name and the storage location of the electronic mail.

According to the second exemplary embodiment, a link file management process of FIG. 19 is performed periodically by starting up the file management program periodically. The link file management program is an example of the process of a deletion unit. In step 140, the CPU 10A defaults a variable S to zero. The variable S is used to set the total number of link files. In step 142, the CPU 10A searches the file management DB 20 for the management information of an unprocessed link file registered therewithin (for example, the management information where "*_LINK" is set as the "type"). In step 144, the CPU 10A determines whether an unprocessed link file is present in the file storage region, depending on whether the management information extracted in the search in step 142** is extracted or not.

If the determination in step 144 is affirmative, processing proceeds to step 146. The CPU 10A increments the variable S by 1. In step 148, the CPU 10A calculates an access frequency of the link file having the extracted management information in accordance with "(registration) time and date" and "(access) count" set in the management information of the link file extracted in the search in step 142. The CPU 10A causes the memory 10B to store the calculated access frequency with the content identifier of the link file mapped thereto. Processing returns to step 142. Steps 142 to 148 are repeated until the determination in step 144 becomes non-affirmative. The CPU 10A thus sets for the variable S the total number of link files having the management information registered on the file management DB 20 and calculates and stores the access count of each of the link files having the management information registered on the file management DB 20.

If the above process is performed on the link file having the management information registered on the file management DB 20, the determination in step 144 becomes non-affirmative. Processing proceeds to step 150. The CPU 10A determines whether the variable S (the total number of link files having the management information registered on the file management DB 20) is larger than a predetermined threshold value Smax. If the determination in step 150 is non-affirmative, the total number of link files present within the file storage region is equal to or smaller than the threshold value Smax. The link file management process is complete.

According to the second exemplary embodiment, the link file having as the link destination the file moved in storage location is generated at the storage location prior to the movement of the file each time the file is moved in storage location within the file storage region. The number of link files present in the file storage region may increase and the total number of link files may become larger than the threshold value Smax. The determination in step 150 becomes affirmative in response, and processing proceeds to step 152. A link file having a minimum access frequency, out of those calculated and stored on the memory 10B, is extracted. In step 154, the CPU 10A deletes from the file storage region the link file having the minimum access frequency extracted. In step 156, the CPU 10A deletes from the file management DB 20 the management information of the deleted link file. In step 158, the CPU 10A decrements the variable S by 1, and then returns to step 150.

Steps 150 to 158 are repeated until the determination in step 150 becomes non-affirmative. Link files present in the file storage region are deleted in the order of small to large access frequency until the total number S of link files present in the file storage region becomes equal to or smaller than the threshold value Smax. Rather than in the order of small to large access frequency, link files may be deleted in the order of long to short of a time elapse from the registration of the management information on the file management DB 20, or in the order from small to large access count.

According to the second exemplary embodiment, the content identifier attached to the file at the link destination is set at the "link destination" of the management information of the link file. Each time the file is moved in storage location, the "location identifier" of the moved file is modified to the identifier of the storage location of the destination position of the file. Even if the file at the link destination is moved by multiple times, the file pointed to by each link file and the storage location of the file are identified in accordance with the information registered on the file management DB 20. The content identifier attached to the file at the link destination is set at the "link destination" of the management information of the link file. Even if the file is moved in storage location, the information processing apparatus 10 is free from a process of searching and then modifying the management information of the link file having the moved file as a link destination.

In the above discussion, the management information of the link file stored on the file management DB 20 is used to determine the file at the link destination each time the link file is selected. The invention is not limited to this arrangement. In each of the above exemplary embodiments, each time the file in the file storage region is moved in storage location, the link file having as a link destination the moved file is generated at the storage location of the file prior to the movement, and the management information of the link file is additionally registered on the file management DB 20. If a link file having a given file as a link destination is present, the link file indicates the location where the file as the link destination of the link file has been stored. If an instruction to output a movement history of a particular file is placed, the management information of all link files having the particular file as a link destination may be searched for and the storage location of the link file extracted in the search may be output as the history information of the storage location of the particular file. The "(registration) time and date" of the link file discussed with reference to the second exemplary embodiment are identical to movement time and date of the storage location of the file at the link destination. The movement time and date of the storage location of the file may be output as the movement history. This arrangement falls into the scope of the invention.

In the discussion, the link file is generated at the storage location of the file prior to the movement each time the file is moved to another storage location. The present invention is not limited to this arrangement. When the file is moved, the CPU 10A may update the management information of the link file having the moved file as a link destination without generating a link file at the storage location of the file prior to the movement. The generation of the link file and the registration of the management information may be performed only if the user instructs the link file to be generated. Such an arrangement falls into the scope of the invention.

In the discussion, the user directly operates the information processing apparatus 10 functioning as an example of the file management apparatus. The invention is not limited to this arrangement. For example, a server computer connected to multiple terminal devices via a communication line may serve as an example of the file management apparatus. The user may operate one of the terminal devices to perform a variety of processes including storing a file, modifying a name of the file, deleting the file, compressing a folder, and accessing the file via a link file.

In the discussion, the link file is generated at the storage location of the file prior to the movement if the file is moved to another storage location. According to the exemplary embodiments of the invention, the link file is not limited to a link file that is generated in response to the movement of the file at the link destination. The link file may be a link file that is generated in response to an operation that the user performs to generate the link file at any desired storage location. In such a case, as well, if the management information is registered on the file management DB 20, the same processes as those applied to the link file generated in response to the movement of the file at the link destination to another storage location are also applied.

According to the exemplary embodiments of the invention, the file management program is pre-stored (installed) on the storage unit 10C of the information processing apparatus 10. The file management program may be supplied in a recorded form on a recording medium such as a compact-disc ROM (CD-ROM) or digital versatile disc ROM (DVD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A file management apparatus comprising:
   a register unit that, with a link file pointing to a file generated, registers on a memory a first information set mapping the generated link file to the file and registers on the memory a second information set indicating a storage location of the file if the file is newly stored or if the link file pointing to the file is generated;
   a processor unit that, with any link file accessed, performs a process to determine a storage location of a file pointed to by the accessed link file in accordance with the first information set and the second information set registered on the memory, and a process to access the file stored at the determined storage location; and
   an update unit that, with the file mapped to the link file by the first information set registered on the memory being moved in storage location, updates the second information set indicating the storage location of the file such that the second information set indicates a storage location of the file subsequent to the movement of the file.

2. The file management apparatus according to claim 1, further comprising a generator unit that, each time any file is moved in storage location, generates a link file pointing to the file moved in storage location at the storage location of the file prior to the movement.

3. The file management apparatus according to claim 2, wherein the register unit registers on the memory, as the first information set, information including link storage location information indicating a storage location of the generated link file; and
   wherein the file management apparatus further includes a movement history output unit that, if an instruction to output a movement history of a particular file is placed, reads from the memory the link storage location information included in the first information set of all link files pointing to the particular file, and outputs the storage location, indicated by the read link storage location information, as the movement history of the storage location of the particular file.

4. The file management apparatus according to claim 1, further comprising a deletion unit that manages, for each of the link files having information registered on the memory, a count of accesses made to the link file, a frequency of accesses made to the link file, and elapsed time from the generation of the link file, selects a link file as a deletion target from the link files in accordance with the count of accesses made to the link file, the frequency of accesses made to the link file, and the elapsed time from the generation of the link file, managed on a per link file basis if the number of files having information registered on the memory exceeds a predetermined value, deletes the selected link file as the deletion target, and deletes from the memory the information corresponding to the deleted link file.

5. The file management apparatus according to claim 2, further comprising a deletion unit that manages, for each of the link files having information registered on the memory, a count of accesses made to the link file, a frequency of accesses made to the link file, and elapsed time from the generation of the link file, selects a link file as a deletion target from the link files in accordance with the count of accesses made to the link file, the frequency of accesses made to the link file, and the elapsed time from the generation of the link file, managed on a per link file basis if the number of files having information registered on the memory exceeds a predetermined value, deletes the selected link file as the deletion target, and deletes from the memory the information corresponding to the deleted link file.

6. The file management apparatus according to claim 3, further comprising a deletion unit that manages, for each of the link files having information registered on the memory, a count of accesses made to the link file, a frequency of accesses made to the link file, and elapsed time from the generation of the link file, selects a link file as a deletion target from the link files in accordance with the count of accesses made to the link file, the frequency of accesses made to the link file, and the elapsed time from the generation of the link file, managed on a per link file basis if the number of files having information registered on the memory exceeds a predetermined value, deletes the selected link file as the deletion target, and deletes from the memory the information corresponding to the deleted link file.

7. The file management apparatus according to claim 1, wherein the register unit registers, on the memory, information including a name of the file as at least one of the first information set and the second information set; and
   wherein if a name of any file is changed, and the at least one of the first information set and the second information set including the name of the file prior to the name change is registered on the memory, the update unit updates the name of the file prior to the name change included in the at least one of the first information set and the second information set to the name of the file subsequent to the name change.

8. The file management apparatus according to claim 2, wherein the register unit registers, on the memory, information including a name of the file as at least one of the first information set and the second information set; and
wherein if a name of any file is changed, and the at least one of the first information set and the second information set including the name of the file prior to the name change is registered on the memory, the update unit updates the name of the file prior to the name change included in the at least one of the first information set and the second information set to the name of the file subsequent to the name change.

9. The file management apparatus according to claim 3, wherein the register unit registers, on the memory, information including a name of the file as at least one of the first information set and the second information set; and
wherein if a name of any file is changed, and the at least one of the first information set and the second information set including the name of the file prior to the name change is registered on the memory, the update unit updates the name of the file prior to the name change included in the at least one of the first information set and the second information set to the name of the file subsequent to the name change.

10. The file management apparatus according to claim 4, wherein the register unit registers, on the memory, information including a name of the file as at least one of the first information set and the second information set; and
wherein if a name of any file is changed, and the at least one of the first information set and the second information set including the name of the file prior to the name change is registered on the memory, the update unit updates the name of the file prior to the name change included in the at least one of the first information set and the second information set to the name of the file subsequent to the name change.

11. The file management apparatus according to claim 1, wherein if the file of the first information set mapping the file to the link file registered on the memory is deleted, the update unit attaches, to the first information set, deletion-complete information indicating that the file has been deleted; and
wherein if the deletion-complete information is attached to the first information set corresponding to the accessed link file, the processor unit provides a notification that the file pointed to by the accessed link file has been deleted.

12. The file management apparatus according to claim 2, wherein if the file of the first information set mapping the file to the link file registered on the memory is deleted, the update unit attaches, to the first information set, deletion-complete information indicating that the file has been deleted; and
wherein if the deletion-complete information is attached to the first information set corresponding to the accessed link file, the processor unit provides a notification that the file pointed to by the accessed link file has been deleted.

13. The file management apparatus according to claim 1, wherein if a folder serving as the storage location is compressed together with a file stored in the folder, and the file stored in the compressed folder is a file of the first information set mapping the file to the link file registered on the memory, the update unit updates the first information set to information mapping the link file to the compressed folder; and wherein if the first information set corresponding to the accessed link file is the information mapping the link file to the compressed folder, the processor unit provides a notification that the file pointed to by the accessed link file has been compressed.

14. The file management apparatus according to claim 1, wherein if a folder serving as the storage location is compressed together with a file stored in the folder, and the file stored in the compressed folder is a file of the first information set mapping the file to the link file registered on the memory, the update unit attaches, to the first information set, compression-in-progress information indicating that compression of the corresponding file is in progress; and
wherein if the compress-in-progress information is attached to the first information set corresponding to the accessed link file, the processor unit provides a notification that the compression of the file pointed to by the accessed link file is in progress.

15. The file management apparatus according to claim 1, wherein the register unit registers the second information set with the first information set mapped to the second information set on the memory if the link file pointing to the file is generated; and
wherein if the file mapped to the link file by the first information set registered on the memory is moved in storage location, the update unit updates the second information set, registered on the memory with the first information set mapped to the second information set, to information indicating a storage location of the file subsequent to the movement.

16. The file management apparatus according to claim 1, wherein a file identifier is attached to each file having a link file generated to point to the file in order to uniquely identify the file, and a storage location identifier is attached to each storage location storing the file to identify the storage location;
wherein the register unit registers on the memory, as the second information set indicating a storage location of a file if the file is newly stored, the file identifier newly attached to the stored file, and the storage location identifier attached to the storage location of the file with the file identifier mapped to the storage location identifier, and registers, if a link file pointing to a file is generated, the first information set mapping the generated link file to the file, and the file identifier attached to the file with the first information set mapped to the file identifier; and
wherein if the file mapped to the link file by the first information registered on the memory is moved in storage location, the update unit updates the second information set to information that maps the file identifier attached to the file moved in storage location to the storage location identifier attached to the storage location of the file subsequent to the movement.

17. The file management apparatus according to claim 1, wherein the processor unit notifies a user of the determined storage location or opens the file as a process to access the file stored at the determined storage location.

18. The file management apparatus according to claim 1, wherein if an instruction to store a file pointed to by a link within a body of an electronic mail is placed, the register unit stores the electronic mail at a predetermined storage location, registers on the memory the first information set that maps the file stored in response to the instruction to the stored electronic mail, and registers on the memory the second information set indicating a storage location of the stored electronic mail; and wherein if the file mapped to the electronic mail by the first information set registered on the memory is accessed, the processor unit determines the storage location of the electronic mail mapped to the accessed file in accordance with the first information set and the second information set registered on the memory, and notifies a user of the determined storage location.

19. A file management method, comprising:

with a link file pointing to a file generated, registering on a memory a first information set mapping the generated link file to the file, and registering on the memory a second information set indicating a storage location of the file if the file is newly stored or if the link file pointing to the file is generated;

with any link file accessed, performing a process to determine a storage location of a file pointed to by the accessed link file in accordance with the first information set and the second information set registered on the memory, and a process to access the file stored at the determined storage location; and with the file mapped to the link file by the first information set registered on the memory being moved in storage location, updating the second information set indicating the storage location of the file such that the second information set indicates a storage location of the file subsequent to the movement of the file.

20. A computer readable medium storing a program causing a computer to execute a process for managing a file, the process comprising:

with a link file pointing to a file generated, registering on a memory a first information set mapping the generated link file to the file and registering on the memory a second information set indicating a storage location of the file if the file is newly stored or if the link file pointing to the file is generated;

with any link file accessed, performing at least one of a process to determine a storage location of a file pointed to by the accessed link file in accordance with the first information set and the second information set registered on the memory, and notify of the determined storage location, and a process to access the file stored at the determined storage location; and with the file mapped to the link file by the first information set registered on the memory being moved in storage location, updating the second information set indicating the storage location of the file such that the second information set indicates a storage location of the file subsequent to the movement of the file.

\* \* \* \* \*